US007261958B2

(12) United States Patent
Hirayama et al.

(10) Patent No.: US 7,261,958 B2
(45) Date of Patent: Aug. 28, 2007

(54) MAGNETIC RECORDING MEDIUM AND MAGNETIC RECORDING SYSTEM USING THE SAME

(75) Inventors: Yoshiyuki Hirayama, Kokubunji (JP); Hiroyuki Suzuki, Fujisawa (JP); Hiroyuki Kataoka, Ninomiya (JP); Yotsuo Yahisa, Odawara (JP); Tetsuya Kanbe, Odawara (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 0 days.

(21) Appl. No.: 10/067,333

(22) Filed: Feb. 7, 2002

(65) Prior Publication Data
US 2003/0017369 A1    Jan. 23, 2003

(30) Foreign Application Priority Data
Jun. 28, 2001  (JP) .............................. 2001-195695

(51) Int. Cl.
*G11B 5/66*    (2006.01)
*G11B 5/70*    (2006.01)

(52) U.S. Cl. .................................... 428/829

(58) Field of Classification Search ........ 428/694 TM, 428/694 TS, 336, 900, 611, 667, 668, 828, 428/829, 830
See application file for complete search history.

(56) References Cited

U.S. PATENT DOCUMENTS 6,280,813 B1 *   8/2001   Carey et al. ................ 428/65.3
6,372,330 B1 *   4/2002   Do et al. .................... 428/212
6,383,668 B1 *   5/2002   Fullerton et al. ..... 428/694 TM
6,537,684 B1 *   3/2003   Doerner et al. .............. 428/611
6,645,614 B1 *  11/2003   Girt et al. .................... 428/336
2002/0098389 A1 *   7/2002   Wang et al. ........... 428/694 TS
2002/0160234 A1 *  10/2002   Sakawaki et al. ...... 428/694 TS

FOREIGN PATENT DOCUMENTS

| JP | 04-221418   | 12/1990 |
| JP | 09-293227   | 4/1996  |
| JP | 2001-056924 | 4/2000  |
| JP | 2001-148110 | 10/2000 |

OTHER PUBLICATIONS

Toshio Inase et al., "Magnetic Properties and Recording Characteristics of Co-Cr-Ta-Pt Thin Film Media", Jpn J. Appl. Phys. vol. 32 (1993), pp. 3823-3827.

* cited by examiner

*Primary Examiner*—Holly Rickman
(74) *Attorney, Agent, or Firm*—Reed Smith LLP; Stanley P. Fisher, Esq.; Juan Carlos A. Marquez, Esq.

(57) ABSTRACT

A magnetic recording medium having at least two magnetic layers and a non-magnetic intermediate layer held between them. The first magnetic layer (which is closer to the substrate than the non-magnetic intermediate layer) is formed from an alloy composed of Co, Pr, and Cr, with Pt content being 3-9 at %. The second magnetic layer (which is farther from the substrate than the non-magnetic intermediate layer) is formed from a Co-based alloy containing Pt, Cr, and B. The first and second magnetic layers are magnetized in the mutually antiparallel direction in the absence of an applied magnetic field.

The magnetic recording medium is characterized by good thermal stability for recording bits, high recording resolution, and low media noise. It is suitable for a magnetic storage for high recording density with high reliability.

7 Claims, 21 Drawing Sheets

10 ······ SUBSTRATE
11,11'··· SEED LAYER
12,12'··· UNDER LAYER
13,13'··· THE FIRST MAGNETIC LAYER
14,14'··· NON-MAGNETIC INTERMEDIATE LAYER
15,15'··· THE SECOND MAGNETIC LAYER
16,16'··· PROTECTIVE LAYER
17,17'··· LUBRICANT LAYER

FIG.2

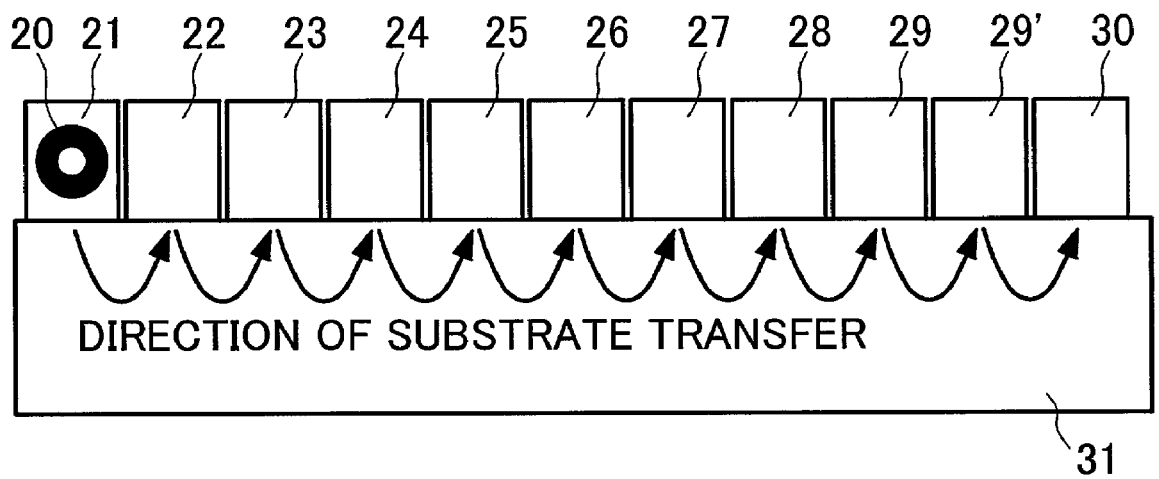

DIRECTION OF SUBSTRATE TRANSFER

20···SUBSTRATE
21···LOAD-LOCK CHAMBER
22···SEED LAYER FORMING CHAMBER
23···HEATING CHAMBER
24···UNDERLAYER FORMING CHAMBER
25···UNDERLAYER FORMING CHAMBER
26···MAGNETIC LAYER FORMING CHAMBER
27···NON-MAGNETIC INTERMEDIATE LAYER
    FORMING CHAMBER
28···MAGNETIC LAYER FORMING CHAMBER
29,29'···PROTECTIVE LAYER FORMING CHAMBER
30···UNLOAD-LOCK CHAMBER
31···MAIN CHAMBER

32···MAGNETIZATION CURVE
33···MAGNETIZATION CURVE OF THE FIRST MAGNETIC LAYER
   WHICH IS OBTAINED WITH THE MAGNETIZATION CURVE 32
34···MAGNETIZATION CURVE OF THE SECOND MAGNETIC LAYER
   WHICH IS OBTAINED WITH THE MAGNETIZATION CURVE 32

40···CURVE WHICH IS OBTAINED BY DIFFERENTIATING THE MAGNETIZATION M BY THE MAGNETIC FIELD H ON THE MAGNETIZATION CURVE 32

191···MAGNETIC RECORDING MEDIUM
192···DRIVING UNIT FOR ROTATING THE MAGNETIC RECORDING MEDIUM
193···MAGNETIC HEAD
194···HEAD ACCESS SYSTEM FOR DRIVING THE MAGNETIC HEAD
195···WRITE/READ SIGNAL PROCESSING MEANS
196···HEAD UNLOADING MECHANISM

201···SUBSTRATE
202···COIL
203···UPPER MAGNETIC POLE
204···LOWER MAGNETIC POLE/UPPER SHIELD LAYER
205···MAGNETORESISTIVE SENSOR
206···ELECTRODE PATTERN
207···LOWER SHIELD LAYER

210···SIGNAL SENSING REGION
211···GAP LAYER
212···Ta BUFFER LAYER
213···FIRST MAGNETIC LAYER
214···INTERMEDIATE LAYER
215···SECOND MAGNETIC LAYER
216···ANTIFERROMAGNETIC ALLOY LAYER
217···TAPERED PORTION
218···PERMANENT MAGNETIC LAYER

MAGNETIC RECORDING MEDIUM AND MAGNETIC RECORDING SYSTEM USING THE SAME

BACKGROUND OF THE INVENTION

1. Field of the Invention

The present invention relates to a magnetic recording medium capable of storing a large amount of information and also to a magnetic storage equipped therewith. More particularly, the present invention relates to a magnetic recording medium suitable for high-density magnetic recording and also to a magnetic storage equipped therewith.

2. Description of Related Arts

The advancing information society processes an ever-increasing amount of information, and there is a strong demand for a high-capacity magnetic storage. Energetic efforts are being made to meet this demand by both improving the sensitivity of the magnetic head and reducing the noise level of the magnetic recording medium. As for the magnetic recording medium, there has appeared a new one which replaces the conventional magnetic film of Co—Cr—Pt, Co—Cr—Ta, or Co—Cr—Pt—Ta alloy. For example, Japanese Patent Laid-open No. 221418/1992 discloses a magnetic recording medium for high density recording which is characterized by a cobalt-alloy magnetic layer containing at least platinum and boron for increase in coercive force. Also, Japanese Patent Laid-open No. 293227/1997 discloses a magnetic recording medium which has a Cr—Mo underlayer and a Co—Cr—Pt—B magnetic layer in combination. These inventions are intended to reduce the noise level of the recording medium through improvement in the material of the underlayer or the material of the magnetic layer. On the other hand, an approach to noise reduction is being made through reduction of grain size in the magnetic layer. The disadvantage of this approach is that recorded bits are thermally unstable. One possible way to avoid this disadvantage is to enhance the magnetic anisotropy of the magnetic film. However, its upper limit is determined by the writing magnetic field of the recording head.

For improvement of the thermal stability of recorded bits and reduction in media noise, Japanese Patent Laid-open Nos. 56924/2001 and 148110/2001 disclose a magnetic recording medium having on a substrate a recording layer composed of at least two magnetic layers which are anti-ferromagnetically coupled through a non-magnetic coupling layer. (This recording medium will be referred to as "anti-ferromagnetically coupled medium" hereinafter.) The anti-ferromagnetic coupling is realized when the non-magnetic coupling layer is a non-magnetic film of Ru or the like which has a thickness of 0.4 to 1.0 nm. The anti-ferromagnetically coupled medium offers the advantage of keeping the residual magnetic flux density low despite its large thickness. This is because the two magnetic layers holding the non-magnetic coupling layer between them are magnetized in mutually anti-parallel directions in the absence of an applied magnetic field. The result is high-density recording as well as good thermal stability.

The anti-ferromagnetically coupled medium is expected to have greatly improved thermal stability and recording resolution as mentioned above; however, it is not necessarily promising as far as improvement in media noise is concerned. For the recording medium with a reduced residual magnetic flux density, improvement in its S/N ratio is possible by preventing the read output from decreasing due to thermal decay but great reduction in media noise is not achieved yet.

OBJECT AND SUMMARY OF THE INVENTION

It is an object of the present invention to provide an anti-ferromagnetically coupled medium which is characterized by good stability to thermal decay, high recording resolution, and low media noise, and hence is suitable for a magnetic storage with a high recoding density.

The above-mentioned object is achieved when the anti-ferromagnetically coupled medium consists of two magnetic layers specified below. The first magnetic layer, which is closer to the substrate than the non-magnetic intermediate layer of Ru or the like, is formed from an alloy composed of Co (major component), Pt, and Cr, with the content of Pt being 3-9 at %. The second magnetic layer, which is farther from the substrate than the non-magnetic intermediate layer, is formed from an alloy composed mainly of Co. In addition, the first magnetic layer has an underlayer formed from an alloy composed of Cr (major component) and Ti. This structure contributes to reduction in media noise. If the Cr—Ti alloy for the underlayer is incorporated with B, then a remarkable effect of reducing media noise will be produced. The magnetic layer and non-magnetic layer should preferably have the hexagonal close-pack structure which is oriented in the (11.0) direction. A seed layer, which is an amorphous or microcrystalline metal film, may be interposed between the substrate and the underlayer. It enhances the orientation of the magnetic layer, thereby reducing media noise further.

It is another object of the present invention to provide a magnetic storage which comprises the above-mentioned magnetic recording medium, a drive to move it in the recording direction, a magnetic head consisting of a recording part and a reproducing part, a means to move the magnetic head relative to the magnetic recording medium, and a means to process recording signals to the magnetic head and reproducing signals from the magnetic head. The reproducing part of the magnetic head is formed from a giant magneto-resistive effect element or a magneto-resistive effect tunnel junction film. Because of this structure, the magnetic storage secures a sufficient signal intensity and a high reliability for high recording density.

BRIEF DESCRIPTION OF THE DRAWINGS

FIG. 2 is a schematic diagram showing one example of the film-forming apparatus to manufacture the magnetic recording medium according to the present invention.

FIG. 3 (lower part) is a diagram showing how to obtain the coupling magnetic field (Hex) from the magnetization curve (by isolating from each other contribution due to the first magnetic layer and contribution due to the second magnetic layer) and to obtain the coercive force (Hcr) of the second magnetic layer.

DESCRIPTION OF THE PREFERRED EMBODIMENTS

Example 1

Figure 1:
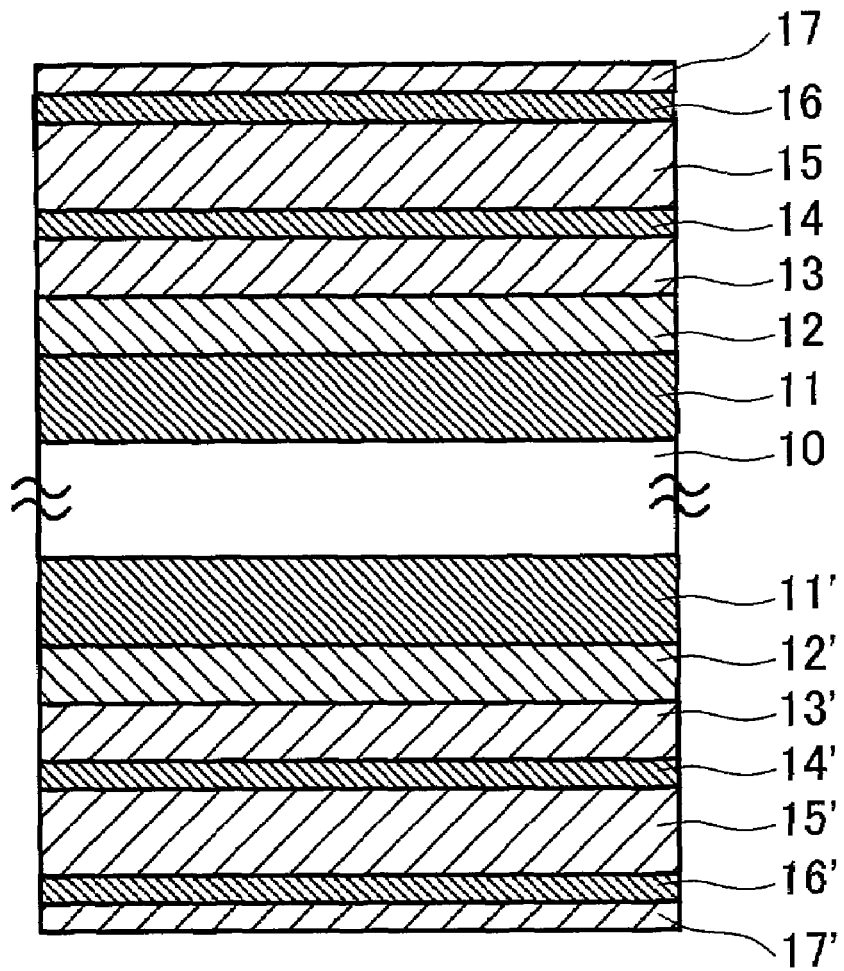
FIG. 1 is a schematic sectional view showing one example of the magnetic recording medium according to the present invention.

This example demonstrates a magnetic recording medium as an embodiment of the present invention. The magnetic recording medium has a sectional structure shown in FIG. 1. It is composed of a substrate and multi-layered films formed thereon. The substrate 10 is a chemically strengthened glass disk, 65 mm in diameter and 0.635 mm in thickness. After cleaning, the substrate was coated with films by using a sputtering machine (MDP250B) made by Intevac. This sputtering machine, which handles substrates one by one, is constructed of a main chamber and multiple chambers (stations) serially arranged along it, as shown in FIG. 2.

The multi-layered films on the substrate 10 include the following layers.

Seed layers 11 and 11' of Ni-(37.5 at %)Ta alloy, 30 nm thick

Underlayers 12 and 12' of Cr-(20 at %)Ti alloy, 5 nm thick

First magnetic layers 13 and 13' of Co-(19 at %)Cr-(6 at %)Pt alloy, 2.7-3.9 nm thick Non-magnetic intermediate layers 14 and 14' of Ru, 0.5 nm thick Second magnetic layers 15 and 15' of Co-(18 at %)Cr-(14 at %)Pt-(8 at %)B, 13-16 nm thick Protective layers 16 and 16 of carbon, 4 nm thick Lubricating layers 17 and 17'

It was confirmed by X-ray diffractometry that the seed layers of Ni—(37.5 at %)Ta alloy have the microcrystalline structure.

Sputtering for all the layers was carried out at an argon pressure of 0.9 Pa. During sputtering, the oxygen partial pressure (monitored in the main chamber 31) was approximately $1 \times 10^{-7}$ to $1 \times 10^{-6}$ Pa.

First, the seed layers were formed on the substrate (not heated) in the seed layer forming chamber 22. The coated substrate was heated to 270° C. by a lamp heater in the heating chamber 23. During heating, the seed layers were exposed to an atmosphere composed of Ar (99%) and $O_2$ (1%) at a pressure of 1.2 Pa (with a flow rate of 27 sccm). Subsequently, the above-mentioned layers were formed sequentially in the underlayer forming chambers 24, the magnetic layer forming chamber 26, the non-magnetic intermediate layer forming chamber 27, the magnetic layer forming chamber 28, the protective layer forming chambers 29 and 29'. In the final step, the protective layers were coated with an organic lubricant to form the lubricating layers 17 and 17'.

Thus, six samples were prepared in which the first and second magnetic layers have a thickness of tmag1 and tmag2, respectively, as shown in Table 1. The samples are designated as 4401A-4409A.

COMPARATIVE EXAMPLE 1

Samples of magnetic recording medium for comparison were prepared by the same procedure as in Example 1 except for the following.

The underlayers 12 and 12' are of laminate structure consisting a 5-nm thick layer of Cr-(20 at %)Ti alloy and a 3-nm thick layer of Co-(40 at %)Ru alloy having the hexagonal close-pack structure, which are formed in the order mentioned.

The first magnetic layers 13 and 13' were formed from any of the following alloys.

Co-(16 at %)Cr-(12 at %)Pt-(8 at %)B, (sample Nos. 4101A to 4109A)

Co-(22 at %)Cr-(10 at %)Pt-(4 at %)B, (sample Nos. 3006A to 3009A)

Co-(22 at %)Cr-(12 at %)Pt-(4 at %)B, (sample Nos. 2611A to 2614A)

Co-(22 at %)Cr-(14 at %)Pt-(4 at %)B, (sample Nos. 2910A to 2913A)

Co-(18 at %)Cr-(8 at %)Pt-(2 at %)Ta, (sample Nos. 6003B to 6007B)

The underlayer of Co-(40 at %)Ru alloy was formed in the underlayer forming chamber 25, which was not used in Example 1. In each sample, the first and second magnetic layers have a thickness of tmag1 and tmag2, respectively, shown in Table 1.

In this comparative example, the underlayer of Co-(40 at %)Ru alloy was used for the reason given below. In the case where this underlayer is omitted (in other words, the layer structure is the same as that in Example 1), the resulting sample has such a small coercive force and squareness ratio that it does not work satisfactorily as a magnetic recording medium. The magnetic layer and non-magnetic intermediate layer in this sample showed no clear crystal orientation when examined by X-ray diffractometry.

COMPARATIVE EXAMPLE 2

Samples of magnetic recording medium for comparison were prepared by the same procedure as in Example 1 except for the following.

The underlayers 12 and 12' are of laminate structure consisting a 5-nm thick layer of Cr-(15 at %)Ti alloy and a 3-nm thick layer of Cr-(16 at %)Mo alloy, which are formed in the order mentioned.

The first magnetic layers 13 and 13' were formed from any of the following alloys.

Co-(16 at %)Cr-(6 at %)Pt-(8 at %)B, (sample Nos. 5702A to 5707A)

Co-(19 at %)Cr-(6 at %)Pt-(8 at %)B, (sample Nos. 5703B to 5707B)

Co-(22 at %)Cr-(6 at %)Pt-(8 at %)B, (sample Nos. 5803A to 5808A)

Co-(12 at %)Cr-(6 at %)Ta, (sample Nos. 5604A to 5607A)

Co-(16 at %)Cr-(8 at %)B, (sample Nos. 5802B to 5807B)

The underlayer of Co-(16 at %)Mo alloy was formed in the underlayer forming chamber 25, which was not used in Example 1. In each sample, the first and second magnetic layers have a thickness of tmag1 and tmag2, respectively, as shown in Table 1. Incidentally, for the same reason as mentioned in Comparative Example 1, the layer of Co-(16 at %)Mo alloy was interposed between the layer of Cr-(15 at %)Ti alloy and the first magnetic layer. The layer of Co-(40 at %)Ru alloy in Comparative Example 1 was replaced by the layer of Co-(16 at %)Mo alloy in consideration of lattice matching with the magnetic layer.

TABLE 1

| Composition of the first magnetic layer | Sample No. | tmag1 (nm) | tmag2 (nm) | Brt (T-nm) | Hcr (kA/m) | Hex (kA/m) | Smf/Slf (%) | Slf/Nd (dB) |
| --- | --- | --- | --- | --- | --- | --- | --- | --- |
| Co-(19 at %)Cr-(6 at %)Pt | 4401A | 3.9 | 14.0 | 3.50 | 325 | −52 | 51.4 | 24.6 |
| | 4402A | 3.3 | 14.0 | 3.78 | 313 | −58 | 50.5 | 24.4 |
| | 4406A | 2.7 | 16.0 | 4.73 | 319 | −75 | 49.2 | 24.2 |
| | 4407A | 2.7 | 15.0 | 4.26 | 312 | −67 | 49.9 | 24.5 |
| | 4408A | 2.7 | 14.0 | 3.88 | 297 | −58 | 49.9 | 24.5 |
| | 4409A | 2.7 | 13.0 | 3.52 | 282 | −50 | 50.6 | 24.6 |
| Co-(16 at %)Cr-(12 at %)Pt-(8 at %)B | 4101A | 4.6 | 13.0 | 2.37 | 276 | −26 | 54.5 | 23.3 |
| | 4102A | 3.0 | 13.0 | 3.11 | 280 | −49 | 52.3 | 23.6 |
| | 4107A | 3.8 | 15.0 | 3.71 | 306 | −39 | 50.6 | 23.6 |
| | 4108A | 3.8 | 14.0 | 3.42 | 293 | −39 | 51.8 | 23.5 |
| | 4109A | 3.8 | 13.0 | 2.74 | 275 | −36 | 52.8 | 23.6 |
| Co-(22 at %)Cr-(10 at %)Pt-(4 at %)B | 3006A | 3.7 | 12.9 | 3.68 | 305 | −51 | 50.0 | 23.7 |
| | 3007A | 3.7 | 15.2 | 4.43 | 328 | −42 | 50.0 | 23.2 |
| | 3008A | 3.7 | 16.6 | 4.78 | 345 | −43 | 48.4 | 23.2 |
| | 3009A | 3.7 | 18.4 | 5.54 | 347 | −42 | 47.9 | 23.2 |
| Co-(22 at %)Cr-(12 at %)Pt-(4 at %)B | 2611A | 3.7 | 14.8 | 3.66 | 305 | −49 | 51.8 | 22.9 |
| | 2612A | 3.7 | 16.7 | 4.15 | 330 | −51 | 50.5 | 22.8 |
| | 2613A | 3.7 | 18.5 | 4.83 | 333 | −48 | 49.1 | 22.7 |
| | 2614A | 3.7 | 20.4 | 5.30 | 332 | −45 | 48.4 | 22.3 |
| Co-(22 at %)Cr-(14 at %)Pt-(4 at %)B | 2910A | 3.7 | 12.9 | 3.53 | 288 | −57 | 50.8 | 23.4 |
| | 2911A | 3.7 | 15.2 | 4.37 | 315 | −50 | 50.4 | 23.3 |
| | 2912A | 3.7 | 16.6 | 4.71 | 327 | −48 | 49.1 | 23.1 |
| | 2913A | 3.7 | 18.4 | 5.36 | 331 | −43 | 48.8 | 22.7 |
| Co-(18 at %)Cr-(8 at %)Pt-(2 at %)Ta | 6003B | 6.0 | 14.5 | 2.86 | 283 | −35 | 52.1 | 23.4 |
| | 6004B | 4.0 | 14.5 | 3.85 | 283 | −51 | 51.1 | 23.3 |
| | 6006B | 5.0 | 16.0 | 3.84 | 297 | −41 | 50.0 | 23.2 |
| | 6007B | 5.0 | 14.5 | 3.28 | 286 | −42 | 51.2 | 23.3 |
| Co-(16 at %)Cr-(6 at %)Pt-(8 at %)B | 5702A | 5.5 | 14.5 | 3.39 | 306 | −34 | 51.1 | 23.6 |
| | 5703A | 4.5 | 14.5 | 3.92 | 306 | −45 | 51.4 | 23.6 |
| | 5706A | 3.5 | 16.0 | 4.87 | 312 | −56 | 49.5 | 23.0 |
| | 5707A | 3.5 | 14.5 | 4.43 | 305 | −50 | 50.1 | 23.2 |
| Co-(19 at %)Cr-(6 at %)Pt-(8 at %)B | 5703B | 7.0 | 14.5 | 3.45 | 280 | −37 | 50.8 | 23.5 |
| | 5704B | 5.0 | 14.5 | 4.04 | 282 | −46 | 50.7 | 23.3 |
| | 5706B | 6.0 | 16.0 | 4.23 | 297 | −42 | 50.0 | 23.2 |
| | 5707B | 6.0 | 14.5 | 3.67 | 278 | −43 | 50.0 | 23.7 |
| Co-(22 at %)Cr-(6 at %)Pt-(8 at %)B | 5803A | 7.0 | 14.5 | 4.22 | 260 | −45 | 48.7 | 23.2 |
| | 5806A | 6.0 | 16.0 | 4.79 | 278 | −68 | 47.6 | 22.9 |
| | 5807A | 6.0 | 14.5 | 4.51 | 271 | −61 | 47.5 | 23.3 |
| | 5808A | 6.0 | 13.0 | 3.86 | 253 | −47 | 48.6 | 23.5 |
| Co-(12 at %)Cr-(6 at %)Ta | 5604A | 3.0 | 14.5 | 4.16 | 372 | −61 | 50.7 | 22.9 |
| | 5605A | 2.0 | 14.5 | 4.67 | 368 | −80 | 50.8 | 23.0 |
| | 5606A | 4.0 | 16.0 | 4.37 | 388 | −31 | 49.9 | 23.0 |
| | 5607A | 4.0 | 14.5 | 3.95 | 380 | −26 | 50.4 | 23.0 |

TABLE 1-continued

| Composition of the first magnetic layer | Sample No. | tmag1 (nm) | tmag2 (nm) | Brt (T-nm) | Hcr (kA/m) | Hex (kA/m) | Smf/Slf (%) | Slf/Nd (dB) |
|---|---|---|---|---|---|---|---|---|
| Co-(16 at %)Cr-(8 at %)B | 5802B | 6.0 | 14.5 | 2.64 | 273 | −36 | 51.1 | 23.5 |
| | 5803B | 5.0 | 14.5 | 3.24 | 268 | −40 | 51.1 | 23.5 |
| | 5806B | 4.0 | 16.0 | 4.26 | 289 | −47 | 49.4 | 23.1 |
| | 5807B | 4.0 | 14.5 | 3.82 | 272 | −52 | 50.0 | 23.2 |

Figure 3:
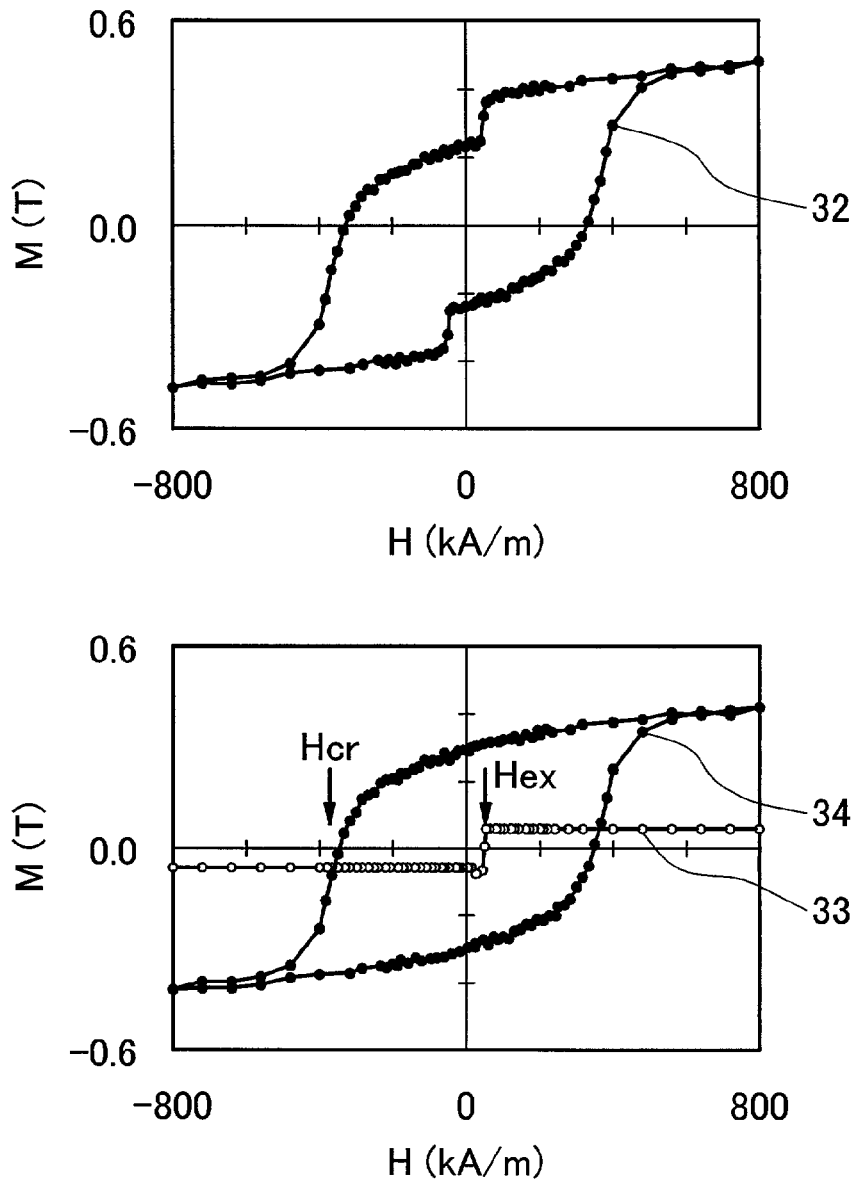
FIG. 3 (upper part) is a magnetization curve of the magnetic recording medium according to the present invention.

Table 1 shows the magnetic characteristics and recoding/reproducing characteristics of the magnetic recording media in Example 1 and Comparative Examples 1 and 2. The magnetic characteristics were evaluated in the following manner by using a vibrating magnetometer. The samples (kept at 25° C.) were subjected to a magnetic field (parallel to the film surface) changing from 800 kA/m (or 10 kOe) to −800 kA/m (or −10 kOe) over a period of about 24 minutes. The sample in Example 1 gave a magnetization curve as shown in FIG. 3. Brt in Table 1 is a product of the total thickness (t) of the magnetic layers and the residual magnetic flux density (Br). The value of Brt was obtained by dividing the magnetic moment in the absence of an applied magnetic field (in the magnetization curve 32) by the layer area of the sample under test. It is noted that the magnetization curve 32 steeply falls when the magnetic field returns from 800 kA/m to about 50 kA/m. This phenomenon is due to magnetization reversal that occurs in the first magnetic layer. In other words, magnetization reversal occurs in the positive magnetic field owing to the anti-ferromagnetical exchange coupling between the first magnetic layer and the second magnetic layer. The residual magnetization in the absence of an applied magnetic field is such that the magnetization reversal in the first magnetic layer has almost completed and the first magnetic layer and the second magnetic layer are magnetized in the mutually anti-parallel directions.

It is important for the anti-ferromagnetically coupled medium to have low residual magnetization and high recording resolution that the two magnetic layers are magnetized in the mutually antiparallel direction. For numerical evaluation, each sample was examined for the magnetic field that brings about magnetization reversal in the first magnetic layer. This magnetic field corresponds to the coupling magnetic field (Hex) for the first magnetic layer and the second magnetic layer. Negative values of Hex represent the anti-ferromagnetic coupling.

Figure 4:
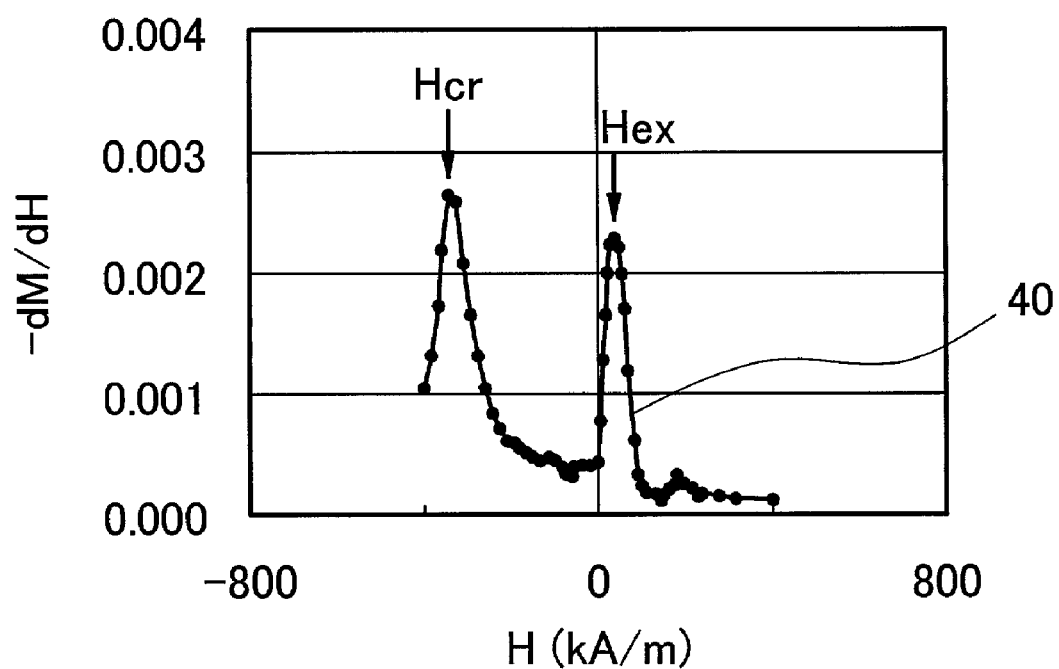
FIG. 4 is a diagram showing how to obtain the coupling magnetic field (Hex) and the coercive force (Hcr) of the second magnetic layer from first-order differential of the magnetization curve of the magnetic recording medium according to the present invention.

Also, each sample was examined for the magnetic field that brings about magnetization reversal in the second magnetic layer (or the coercive force (Hcr) of the second magnetic layer) as a criterion for judging the thermal stability of recording bits and the ease with which the head carries out recording. The values of Hex and Hcr are defined respectively as the magnetic fields at which magnetization becomes zero in the first and second magnetic films. The values of Hex and Hcr are obtained respectively from the curves 33 and 34 in FIG. 3 which are isolated from the curve 32 according to contribution from the first and second magnetic layers. The isolation of the magnetization curve is a consequence of calculations carried out on the assumption that the rapid decrease in magnetization that occurs before the magnetic field becomes zero as the applied magnetic field is decreased is attributable entirely to magnetization in the first magnetic layer. If it is difficult to isolate the magnetization curve, it is also possible to obtain the values of Hex and Hcr from the value of magnetic field at which the curve 40 obtained from first-order differential of the magnetization curve has peaks as shown in FIG. 4. It is also possible to obtain the same value of Hcr by measuring the residual magnetization curve. The recording/reproducing characteristics were evaluated by using a magnetic head consisting of a read head and a write head. The read head is one which utilizes the giant magneto-resistive effect, having a shield gap length (Gs) of 0.09 µm and a track width (Twr) of 0.33 µm. The write head is an inductive one, having a gap length of 0.14 µm and a track width of 0.48 µm. The media S/N ratio was evaluated in terms of Slf/Nd, where Slf denotes the isolated read output at a linear recording density of 790 fr/mm (20 kFCI) and Nd denotes the media noise at a linear recording density of 24800 fr/mm (631 kFCI). The recording resolution was evaluated in terms of the ratio of Smf/Slf, where Smf denotes the read output at a linear recording density of 12400 fr/mm (315 kFCI). The medium in question is more suitable for high-density recording as the values of Slf/Nd and Smf/Slf increase. Reduction in media noise (which is one object of the present invention) is known from an increase in the value of Slf/Nd.

It is noted from Table 1 that all the samples tested have negative values of coupling magnetic field (Hex). This indicates that the two magnetic layers holding a non-magnetic intermediate layer between them are magnetized in the mutually antiparallel directions in the absence of an applied magnetic field.

Figure 5:
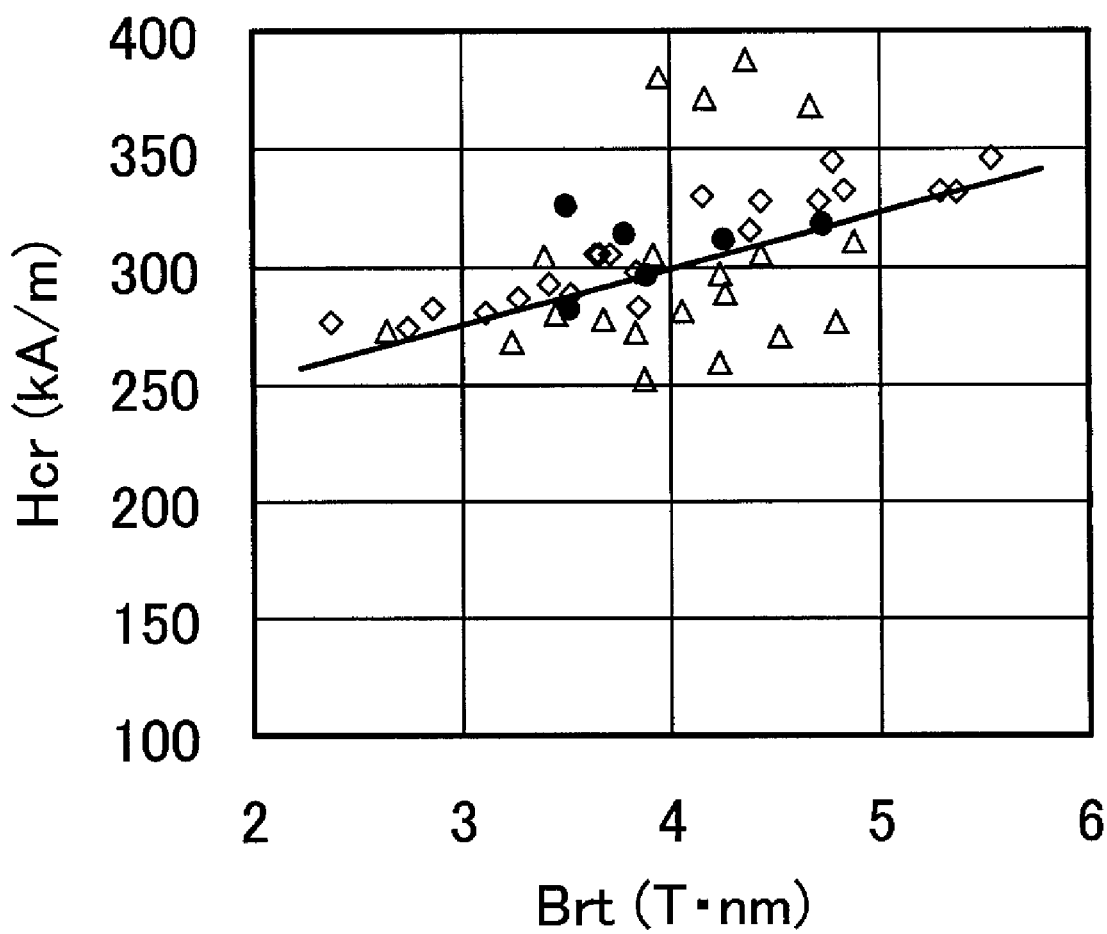
FIG. 5 is a diagram showing the relation between Brt and Hcr of the magnetic recording medium in Example 1 and Comparative Examples 1 and 2.
Figure 6:
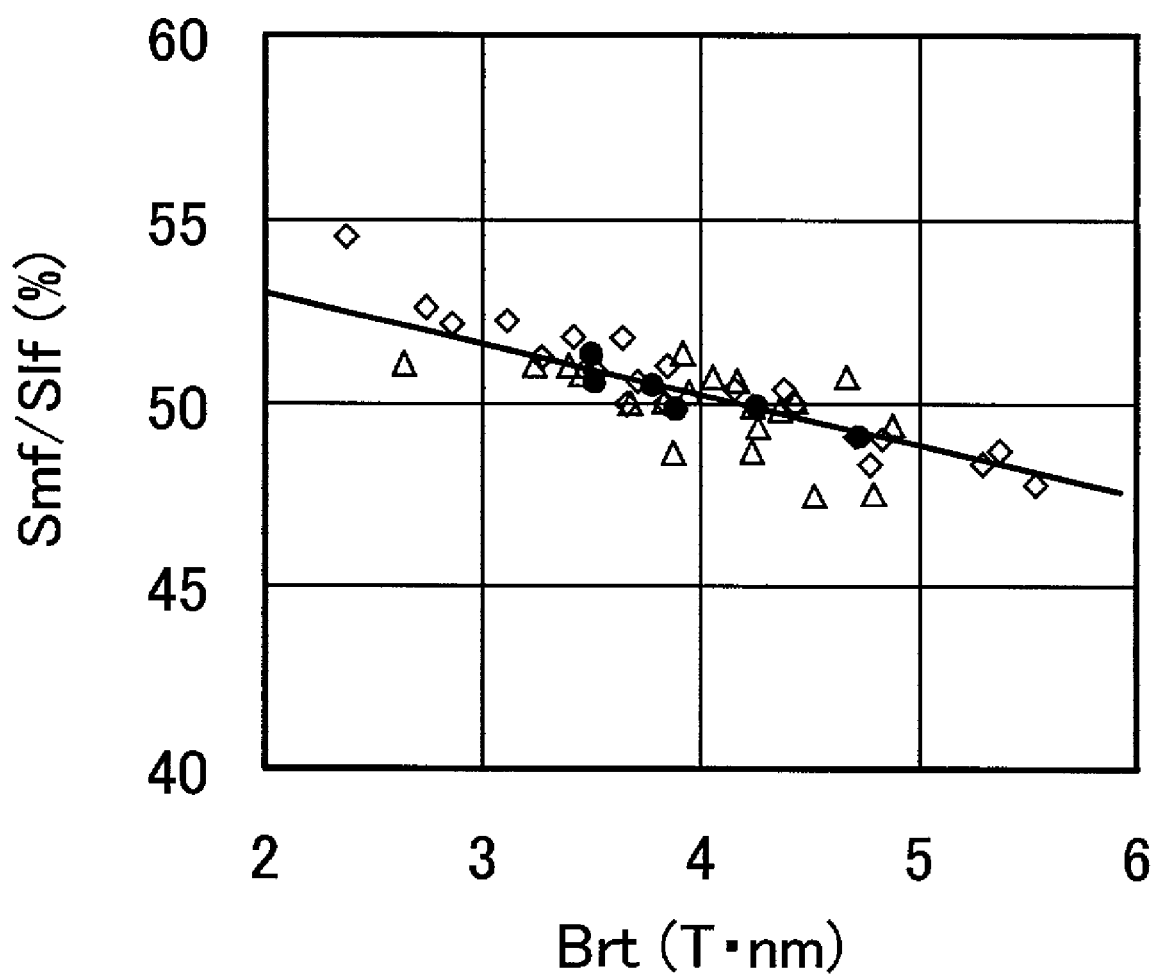
FIG. 6 is a diagram showing the relation between Brt and Smf/Slf of the magnetic recording medium in Example 1 and Comparative Examples 1 and 2.
Figure 7:
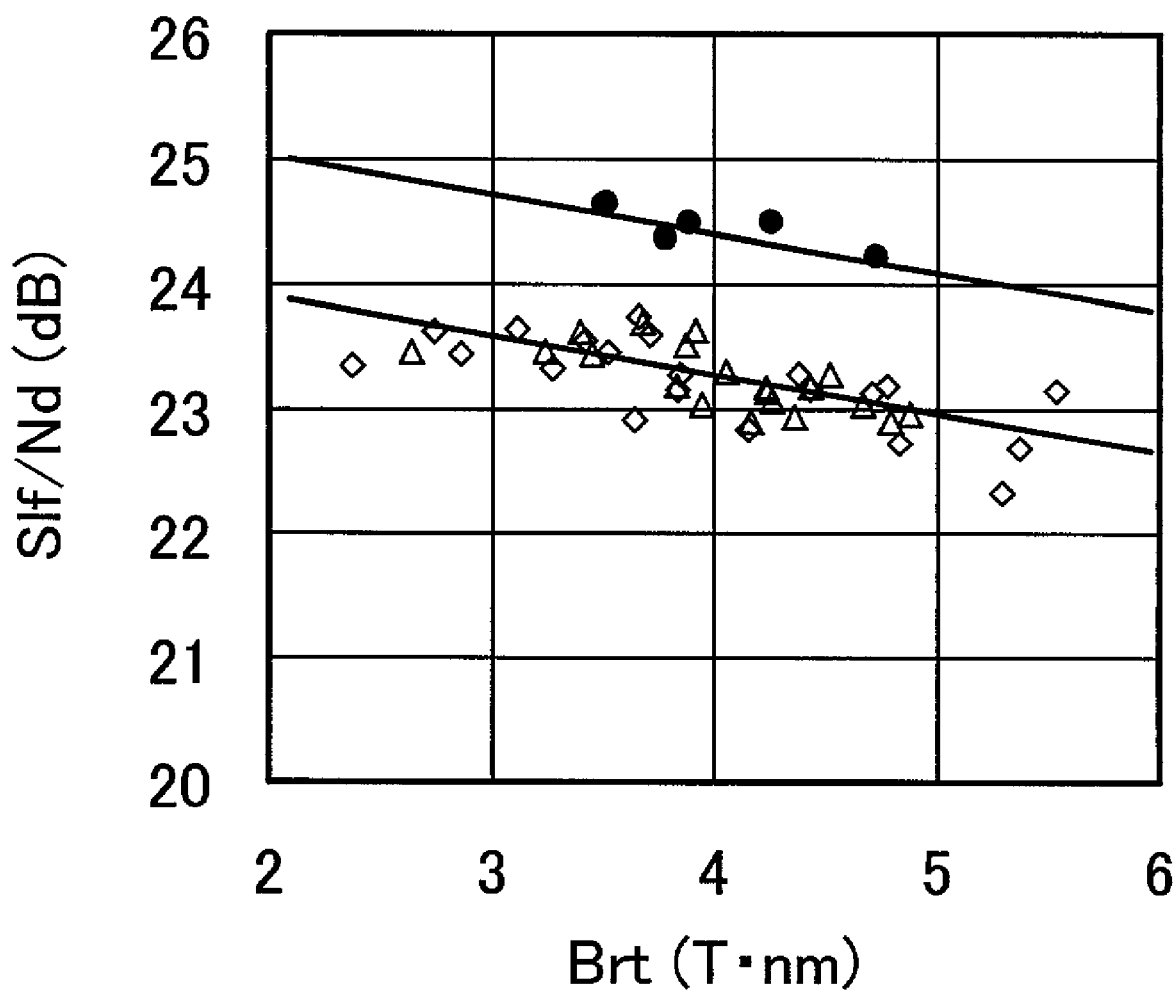
FIG. 7 is a diagram showing the relation between Brt and Slf/Nd of the magnetic recording medium in Example 1 and Comparative Examples 1 and 2.

The coercive force (Hcr), resolution (Smf/Slf), and media S/N ratio (Slf/Nd) of the samples tested are plotted against the values of Brt as shown respectively in FIGS. 5, 6, and 7. It is noted that between samples of Example 1 and samples of Comparative Examples 1 and 2 there is no significant difference in Hcr and Smf/Slf but there exists a significant difference in Slf/Nd. This difference is attributable to the first magnetic layer formed from Co-(19 at %) Cr-(6 at %)Pt alloy in Example 1. In other words, there is a great difference in Slf/Nd between the anti-ferromagnetically coupled medium having the first magnetic layer formed from Co-(19 at %)Cr-(6 at %)Pt alloy and the anti-ferromagnetically coupled medium having the first magnetic layer formed from Co—Cr alloy containing B or Ta. It is generally believed that B or Ta added to the magnetic film of Co—Cr—Pt promotes segregation of Cr into grain boundary or makes grain size smaller, thereby improving Slf/Nd of recording media. Contrary to this belief, there is a case like Example 1 in which the anti-ferromagnetically coupled medium gives a good value of Slf/Nd when B or Ta is not added to the first magnetic layer.

The samples shown in Table 1 were examined by X-ray diffractometry for crystal orientation. All of them gave diffraction peaks corresponding to the (11.0) orientation of hexagonal close-pack structure in the magnetic layer or non-magnetic intermediate layer. There is no noticeable difference between samples in the intensity of X-ray diffraction peaks. This suggests that all the samples have satisfactorily oriented magnetic layers. In addition, the fact that the Ni—Ta alloy film gave no diffraction peaks at all despite its thickness of 30 nm suggests that the Ni—Ta alloy film is of amorphous structure or microcrystalline structure.

Example 2

Samples of magnetic recording medium were prepared by the same procedure as in Example 1 except for the following.

The first magnetic layers 13 and 13' were formed from any of the following alloys.
Co-(20 at %)Cr-(4 at %)Pt, (sample Nos. 6103A to 6108A)
Co-(14 at %)Cr-(5 at %)Pt, (sample Nos. 7203A to 7208A)
Co-(16 at %)Cr-(8 at %)Pt, (sample Nos. 5503A to 5508A)

The underlayers 12 and 12' (5 nm thick) were formed from Cr-(20 at %)Ti alloy as in Example 1. The first and second magnetic layers have thicknesses of tmag1 and tmag2, respectively, as shown in Table 2.

COMPARATIVE EXAMPLE 3

Samples of magnetic recording medium for comparison were prepared by the same procedure as in Example 1 except for the following.

The first magnetic layers 13 and 13' were formed from any of the following alloys.
Co-(20 at %)Cr-(2 at %)Pt, (sample Nos. 6203A to 6208A)
Co-(16 at %)Cr-(10 at %)Pt, (sample Nos. 6303A to 6308A)
Co-(19 at %)Cr-(12 at %)Pt, (sample Nos. 6403A to 6408A)

Figure 8:
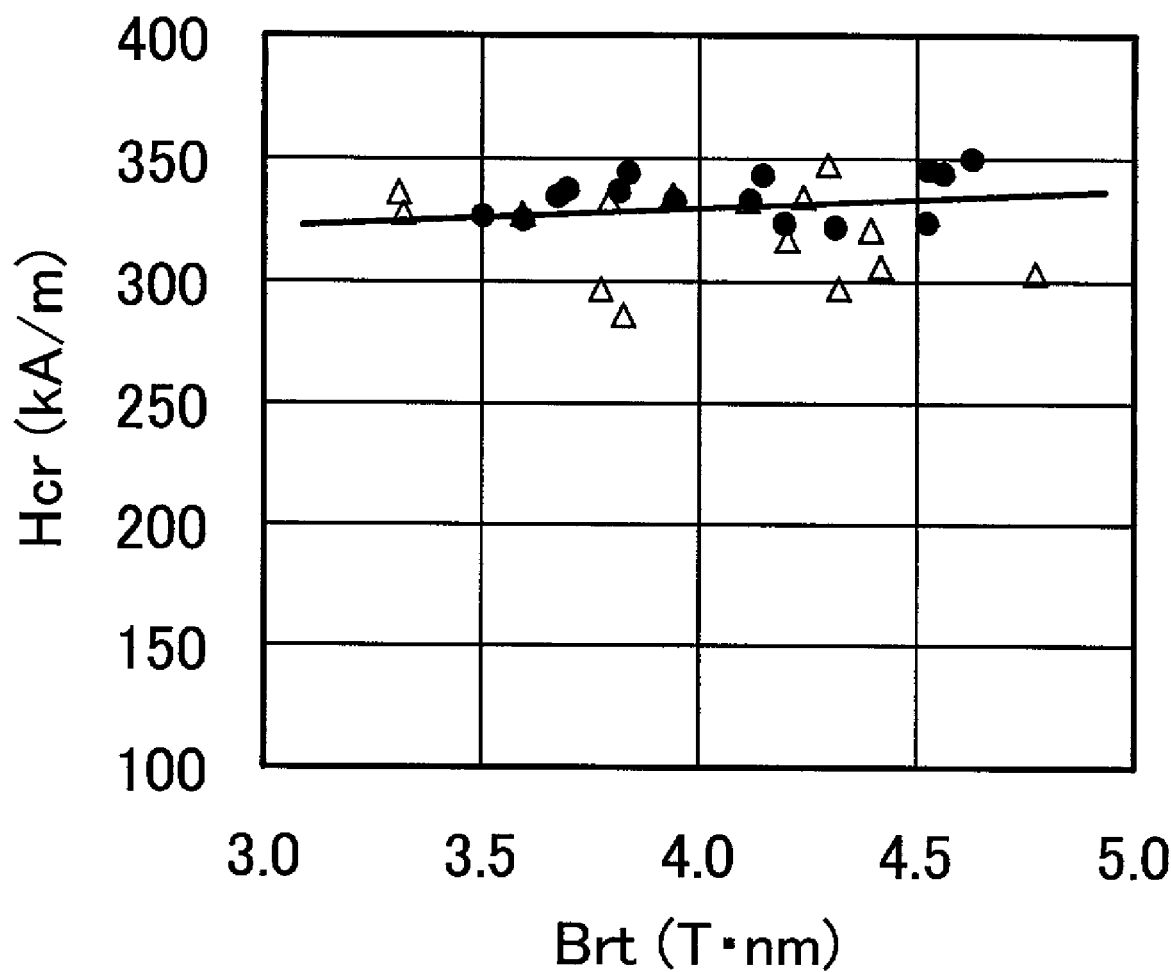
FIG. 8 is a diagram showing the relation between Brt and Hcr of the magnetic recording medium in Example 2 and Comparative Example 3.
Figure 9:
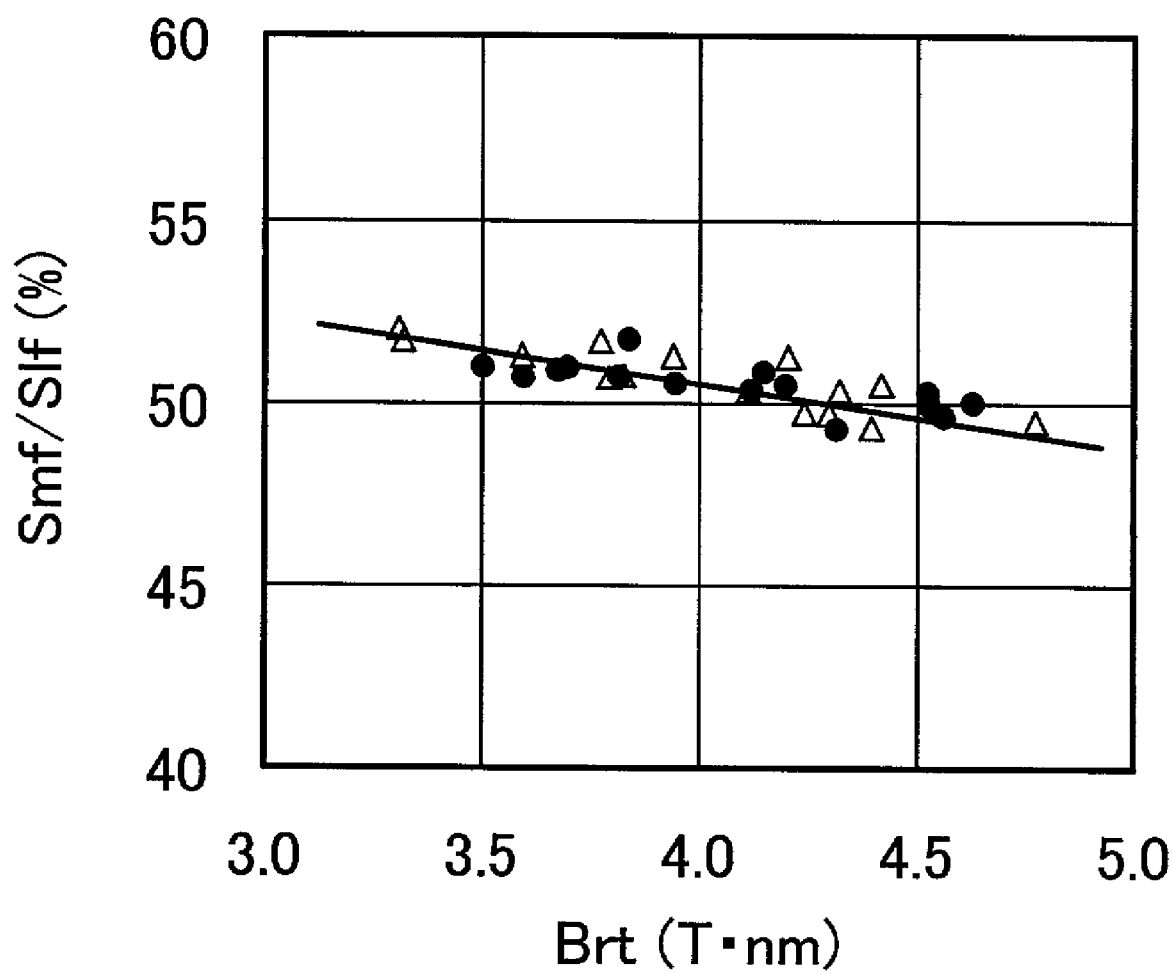
FIG. 9 is a diagram showing the relation between Brt and Smf/Slf of the magnetic recording medium in Example 2 and Comparative Example 3.
Figure 10:
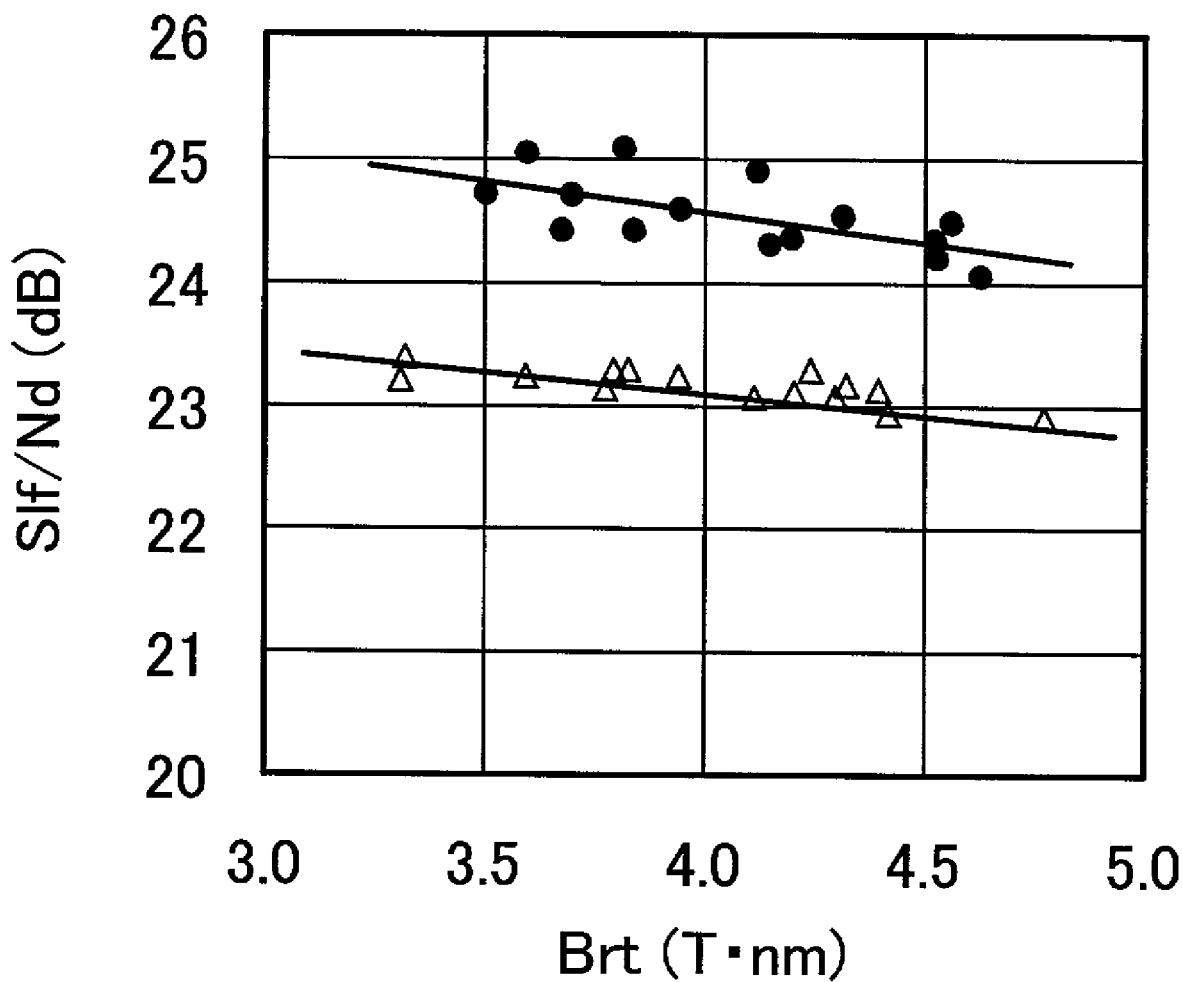
FIG. 10 is a diagram showing the relation between Brt and Slf/Nd of the magnetic recording medium in Example 2 and Comparative Example 3.
Figure 11:
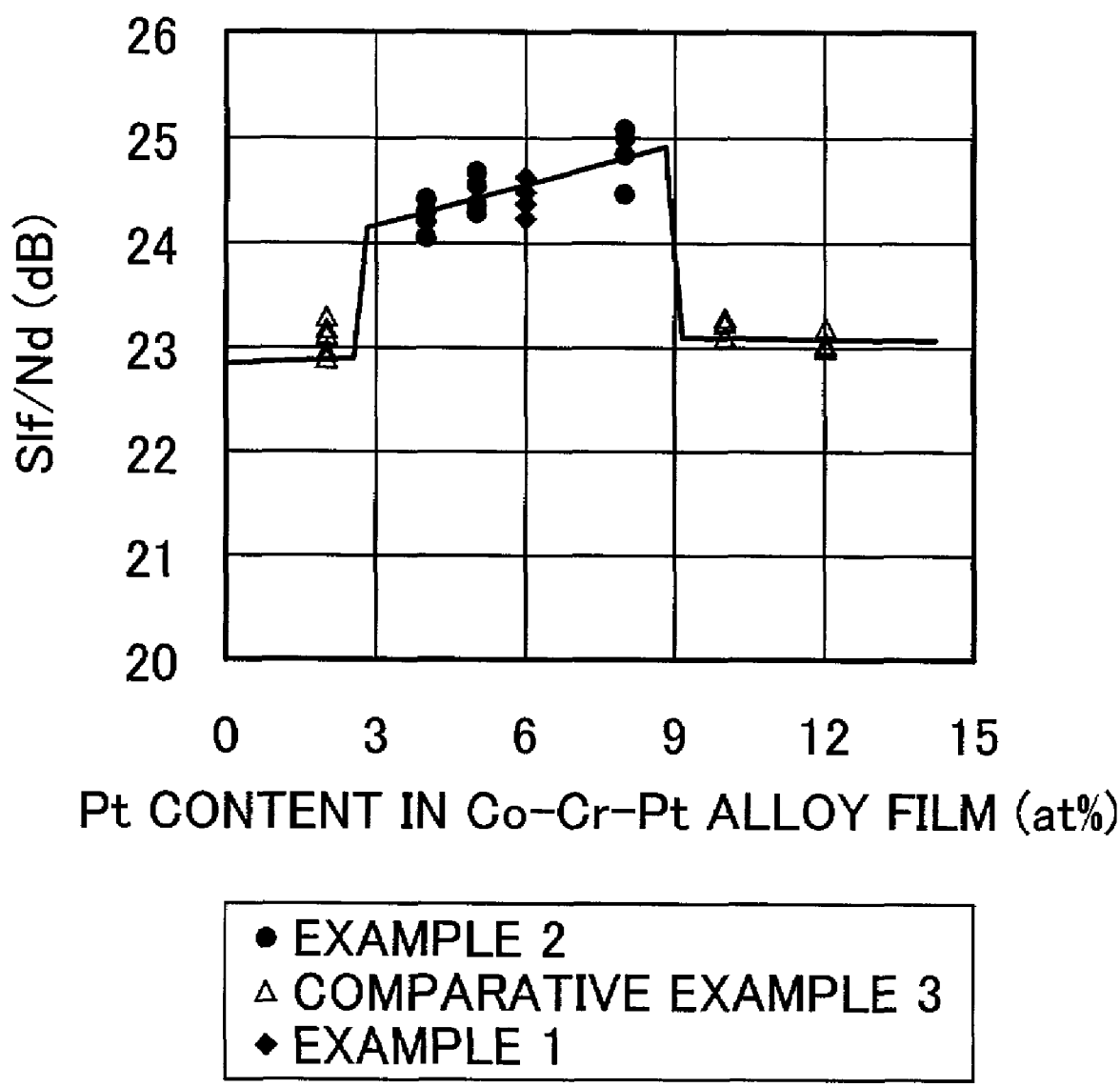
FIG. 11 is a diagram showing the relation between Slf/Nd and the Pt content in Co—Cr—Pt alloy constituting the first magnetic layer in the magnetic recording medium in Example 2 and Comparative Example 3.

The first and second magnetic layers have thicknesses of tmag1 and tmag2, respectively, as shown in Table 2.

coupling magnetic field (Hex). This indicates that the two magnetic layers holding a non-magnetic intermediate layer between them are magnetized in the mutually antiparallel directions in the absence of an applied magnetic field. The coercive force (Hcr), resolution (Smf/Slf), and media S/N ratio (Slf/Nd) of the samples tested are plotted against the values of Brt as shown respectively in FIGS. 8, 9, and 10. It is noted that the former two are approximately the same regardless of the composition of the first magnetic layer. It is noted, however, that the values of Slf/Nd depend largely on the composition of the first magnetic layer. Upon examination of the composition of the first magnetic layer, it was found that the Pt content in the Co—Cr—Pt alloy affects the value of Slf/Nd. So, the values of Slf/Nd of the samples in Examples 1 and 2 and Comparative Example 3 were plotted against the Pt content in the Co—Cr—Pt alloy film as shown in FIG. 11. It is noted that the values of Slf/Nd are clearly different depending on the Pt content. The values of Slf/Nd are high only when the Pt content is 3-9 at %.

Example 3

Samples of magnetic recording medium were prepared by the same procedure as in Example 1 except for the following.

The second magnetic layers 15 and 15' were formed from any of the following alloys.
Co-(16 at %)Cr-(14 at %)Pt-(10 at %)B, (sample Nos. 4401B to 4409B)
Co-(20 at %)Cr-(14 at %)Pt-(6 at %)B, (sample Nos. 6601A to 6604A)

TABLE 2

| Composition of the first magnetic layer | Sample No. | tmag1 (nm) | tmag2 (nm) | Brt (T-nm) | Hcr (kA/m) | Hex (kA/m) | Smf/Slf (%) | Slf/Nd (dB) |
| --- | --- | --- | --- | --- | --- | --- | --- | --- |
| Co-(20 at %)Cr-(4 at %)Pt | 6103A | 5.0 | 14.5 | 3.84 | 345 | −38 | 51.8 | 24.4 |
| | 6104A | 3.0 | 14.5 | 4.53 | 326 | −64 | 50.1 | 24.2 |
| | 6106A | 4.0 | 16.0 | 4.63 | 353 | −50 | 50.2 | 24.1 |
| | 6107A | 4.0 | 14.5 | 4.15 | 343 | −49 | 50.9 | 24.3 |
| | 6108A | 4.0 | 13.0 | 3.68 | 335 | −51 | 50.9 | 24.4 |
| Co-(14 at %)Cr-(5 at %)Pt | 7203A | 3.8 | 14.5 | 3.70 | 337 | −34 | 51.0 | 24.7 |
| | 7204A | 2.7 | 14.5 | 4.20 | 325 | −69 | 50.6 | 24.4 |
| | 7207A | 3.3 | 14.5 | 3.95 | 334 | −47 | 50.6 | 24.6 |
| | 7206A | 3.3 | 16.0 | 4.53 | 348 | −47 | 50.3 | 24.3 |
| | 7208A | 3.3 | 13.0 | 3.50 | 326 | −46 | 51.0 | 24.7 |
| Co-(16 at %)Cr-(8 at %)Pt | 5503A | 3.8 | 14.5 | 3.82 | 337 | −34 | 50.7 | 25.1 |
| | 5504A | 2.7 | 14.5 | 4.32 | 324 | −65 | 49.4 | 24.5 |
| | 5507A | 3.3 | 14.5 | 4.12 | 334 | −46 | 50.4 | 24.9 |
| | 5506A | 3.3 | 16.0 | 4.56 | 346 | −47 | 49.8 | 24.5 |
| | 5508A | 3.3 | 13.0 | 3.60 | 326 | −46 | 50.7 | 25.0 |
| Co-(20 at %)Cr-(2 at %)Pt | 6203A | 5.0 | 14.5 | 3.78 | 297 | −34 | 51.7 | 23.1 |
| | 6204A | 3.0 | 14.5 | 4.43 | 308 | −60 | 50.6 | 23.0 |
| | 6206A | 4.0 | 16.0 | 4.77 | 305 | −47 | 49.7 | 22.9 |
| | 6207A | 4.0 | 14.5 | 4.33 | 298 | −44 | 50.5 | 23.2 |
| | 6208A | 4.0 | 13.0 | 3.83 | 288 | −43 | 50.8 | 23.3 |
| Co-(16 at %)Cr-(10 at %)Pt | 6303A | 5.0 | 14.5 | 3.31 | 336 | −18 | 52.0 | 23.2 |
| | 6304A | 3.0 | 14.5 | 4.21 | 319 | −64 | 51.4 | 23.1 |
| | 6306A | 4.0 | 16.0 | 4.24 | 337 | −41 | 49.8 | 23.3 |
| | 6307A | 4.0 | 14.5 | 3.80 | 335 | −40 | 50.7 | 23.3 |
| | 6308A | 4.0 | 13.0 | 3.32 | 328 | −42 | 51.7 | 23.3 |
| Co-(19 at %)Cr-(12 at %)Pt | 6403A | 5.0 | 14.5 | 3.95 | 337 | −41 | 51.4 | 23.2 |
| | 6404A | 3.0 | 14.5 | 4.40 | 324 | −70 | 49.5 | 23.1 |
| | 6406A | 4.0 | 16.0 | 4.30 | 350 | −56 | 49.8 | 23.1 |
| | 6407A | 4.0 | 14.5 | 4.12 | 335 | −55 | 50.5 | 23.1 |
| | 6408A | 4.0 | 13.0 | 3.60 | 330 | −54 | 51.3 | 23.2 |

Table 2 shows the magnetic characteristics and recoding/reproducing characteristics of the magnetic recording media in Example 2 and Comparative Example 3. It is noted from Table 2 that all the samples tested have negative values of The first magnetic layers 13 and 13' were formed from Co-(19 at %)Cr-(6 at %)Pt alloy as in Example 1. The heating temperature in the heating chamber 23 with a lamp heater was 270° C. for the second magnetic layer formed from Co-(16 at %)Cr-(14 at %)Pt-(10 at %)B alloy and 250° C. for the second magnetic layer formed from Co-(20 at %)Cr-(14 at %)Pt-(6 at %)B alloy.

COMPARATIVE EXAMPLE 4

Samples of magnetic recording medium were prepared by the same procedure as in Comparative Example 1 except for the following.

The first magnetic layer was formed from Co-(16 at %)Cr-(12 at %)Pt-(8 at %)B alloy and the second magnetic layer was formed from Co-(16 at %)Cr-(14 at %)Pt-(10 at %)B alloy. (Sample Nos. 4001B to 4009B). The first magnetic layer was formed from Co-(18 at %)Cr-(12 at %)Pt-(8 at %)B alloy and the second magnetic layer was formed from Co-(20 at %)Cr-(14 at %)Pt-(6 at %)B alloy. (Sample Nos. 6501A to 6504A)

TABLE 3

| Composition of the first magnetic layer | Sample No. | tmag1 (nm) | tmag2 (nm) | Brt (T-nm) | Hcr (kA/m) | Hex (kA/m) | Smf/Slf (%) | Slf/Nd (dB) |
|---|---|---|---|---|---|---|---|---|
| Co-(19 at %)Cr-(6 at %)Pt | 4401A | 3.9 | 14.0 | 3.89 | 328 | −59 | 51.2 | 24.3 |
| | 4402A | 3.3 | 14.0 | 4.26 | 327 | −69 | 49.8 | 24.3 |
| | 4407A | 2.7 | 15.0 | 4.30 | 304 | −61 | 49.5 | 24.3 |
| | 4406A | 2.7 | 14.0 | 4.52 | 304 | −70 | 49.7 | 24.3 |
| | 4409A | 2.7 | 13.0 | 3.98 | 296 | −50 | 50.4 | 24.2 |
| Co-(16 at %)Cr-(12 at %)Pt-(8 at %)B | 4001B | 4.6 | 13.0 | 3.54 | 273 | −32 | 50.4 | 23.1 |
| | 4002B | 3.0 | 13.0 | 4.09 | 280 | −53 | 50.3 | 23.6 |
| | 4007B | 3.8 | 15.0 | 4.13 | 309 | −44 | 48.9 | 23.5 |
| | 4008B | 3.8 | 14.0 | 3.93 | 304 | −43 | 48.8 | 23.4 |
| | 4009B | 3.8 | 13.0 | 3.47 | 295 | −46 | 51.3 | 23.5 |

TABLE 4

| Composition of the first magnetic layer | Sample No. | tmag1 (nm) | tmag2 (nm) | Brt (T-nm) | Hcr (kA/m) | Hex (kA/m) | Smf/Slf (%) | Slf/Nd (dB) |
|---|---|---|---|---|---|---|---|---|
| Co-(19 at %)Cr-(6 at %)Pt | 6601A | 3.9 | 13.2 | 3.31 | 305 | −61 | 51.6 | 24.5 |
| | 6602A | 3.9 | 15.0 | 3.90 | 330 | −63 | 50.3 | 24.4 |
| | 6603A | 3.9 | 16.6 | 4.42 | 333 | −63 | 49.3 | 24.4 |
| | 6604A | 3.9 | 18.2 | 4.89 | 332 | −57 | 48.9 | 24.3 |
| Co-(18 at %)Cr-(12 at %)Pt-(8 at %)B | 6501A | 3.9 | 13.2 | 3.43 | 316 | −53 | 51.0 | 23.5 |
| | 6502A | 3.9 | 15.0 | 3.95 | 332 | −55 | 49.8 | 23.4 |
| | 6503A | 3.9 | 16.6 | 4.57 | 337 | −53 | 49.1 | 23.3 |
| | 6504A | 3.9 | 18.2 | 4.92 | 333 | −49 | 48.5 | 23.0 |

Table 3 shows the magnetic characteristics and recoding/reproducing characteristics of the magnetic recording media in Example 3 and Comparative Example 4, in which the second magnetic layer was formed from Co-(16 at %)Cr-(14 at %)Pt-(10 at %)B alloy. Table 4 shows the magnetic characteristics and recoding/reproducing characteristics of the magnetic recording media in Example 3 and Comparative Example 4, in which the second magnetic layer was formed from Co-(20 at %)Cr-(14 at %)Pt-(6 at %)B alloy. It is noted from Tables 3 and 4 that all the samples tested have negative values of coupling magnetic field (Hex). This indicates that the two magnetic layers holding a non-magnetic intermediate layer between them are magnetized in the mutually antiparallel directions in the absence of an applied magnetic field. The coercive force (Hcr), resolution (Smf/Slf), and media S/N ratio (Slf/Nd) of the samples tested are plotted against the values of Brt as shown respectively in FIGS. 12 and 13. (The samples in FIG. 12 has the second magnetic layer formed from Co-(16 at %)Cr-(14 at %)Pt-(10 at %)B alloy. The sample in FIG. 13 has the second magnetic layer formed from Co-(20 at %)Cr-(14 at %)Pt-(6 at %)B alloy.)

Figure 12:
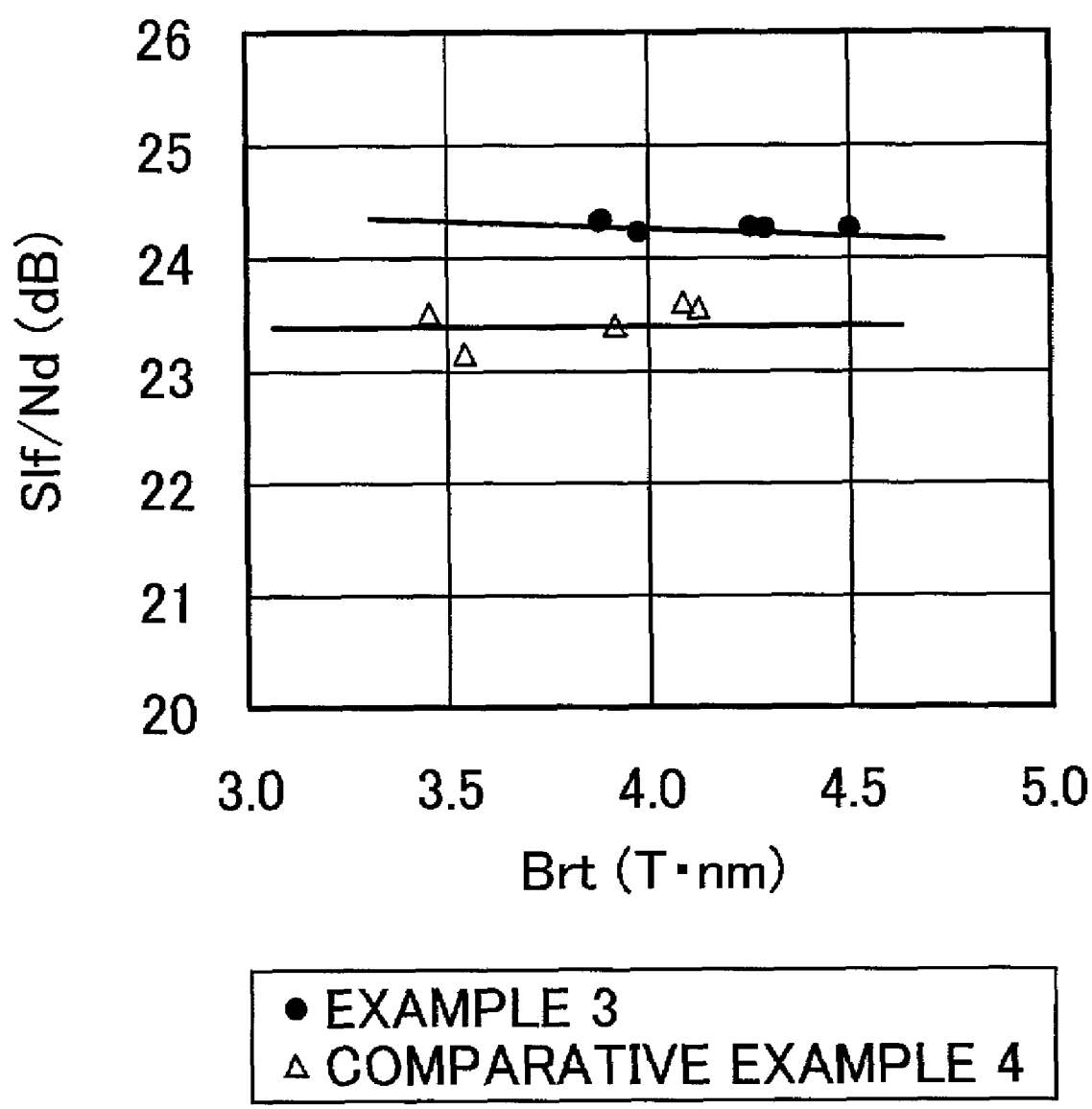
FIG. 12 is a diagram showing the relation between Brt and Slf/Nd of the magnetic recording medium (in which the second magnetic layer is formed from Co-(16 at %)Cr-(14 at %) Pt-(10 at %)B alloy) in Example 3 and Comparative Example 4.
Figure 13:
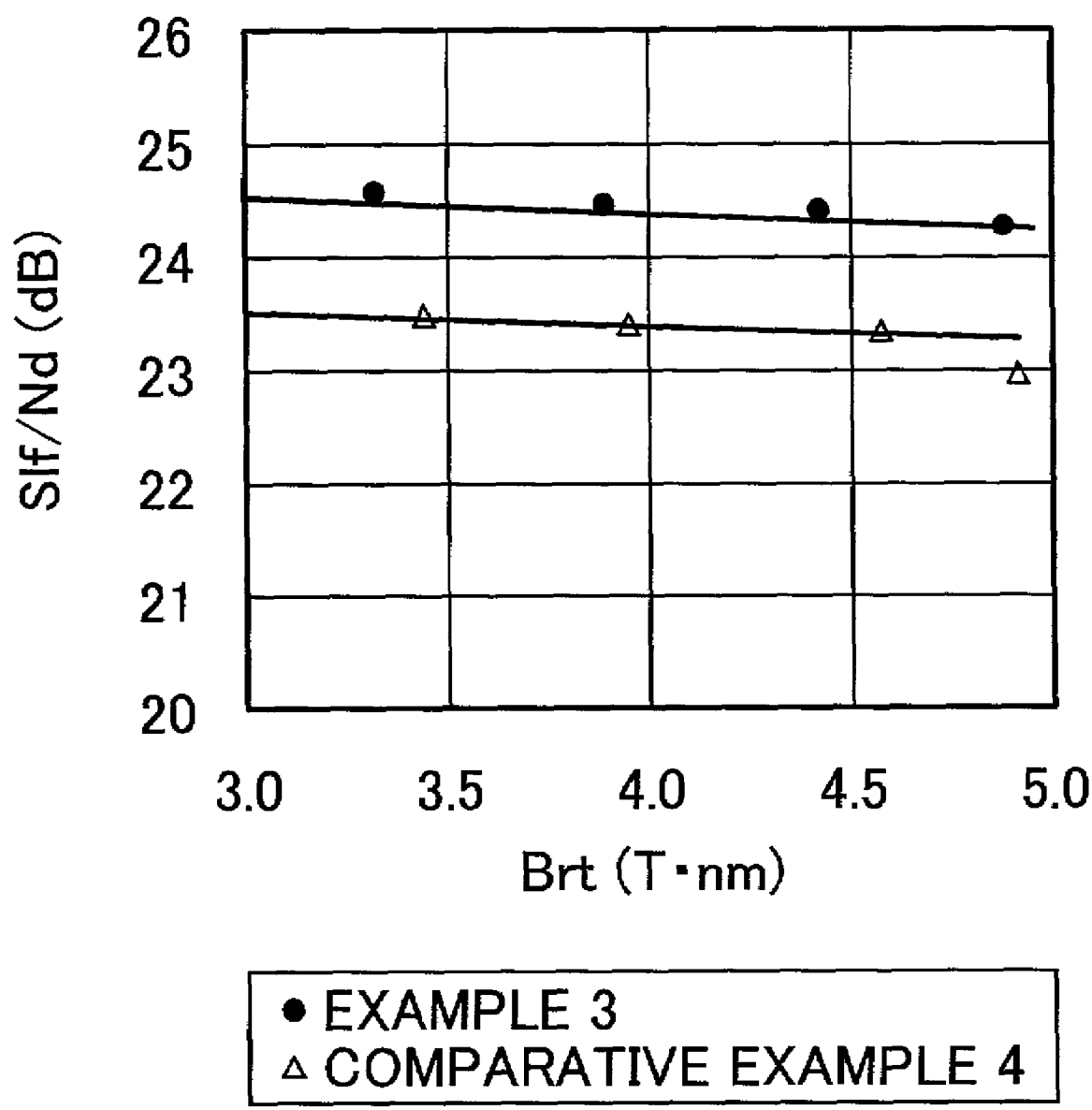
FIG. 13 is a diagram showing the relation between Brt and Slf/Nd of the magnetic recording medium (in which the second magnetic layer is formed from Co-(20 at %)Cr-(14 at %) Pt-(6 at %)B alloy) in Example 3 and Comparative Example 4.

It is noted from FIGS. 12 and 13 that the values of Slf/Nd are higher in the case where the first magnetic layer is formed from Co-(19 at %)Cr-(6 at %)Pt alloy than in the case where the first magnetic layer is formed from Co—Cr—Pt—B alloy. There is significant difference between them. It was possible to improve the value of Slf/Nd by properly selecting the composition of the first magnetic layer regardless of the composition of the second magnetic layer.

Example 4

Samples of magnetic recording medium were prepared by the same procedure as in Example 1 except that the thickness (tRu) of the non-magnetic intermediate layers 14 and 14' of Ru was changed from 0 nm to 1.2 nm (in 7 steps). (Samples Nos. 7106A to 7113A)

The thickness of the first magnetic layers 13 and 13' of Co-(19 at %)Cr-(6 at %)Pt alloy was fixed at 4.3 nm. The thickness of the second magnetic layers 15 and 15' of Co-(18 at %)Cr-(14 at %)Pt-(8 at %)B alloy was fixed at 18.1 nm.

COMPARATIVE EXAMPLE 5

Samples of magnetic recording medium for comparison were prepared by the same procedure as in Example 1 except for the following.

The underlayers 12 and 12' are of laminate structure consisting a 5-nm thick layer of Cr-(20 at %)Ti alloy and a 3-nm thick layer of Co-(40 at %)Ru alloy of hexagonal close-pack structure, which are formed in the order mentioned.

The first magnetic layer has a fixed thickness of 4.3 nm. The second magnetic layer formed from Co-(18 at %)Cr-(14 at %)Pt-(8 at %)B alloy has a fixed thickness of 18.1 nm. The thickness (tRu) of the non-magnetic intermediate layers 14 and 14' was changed from 0 nm to 1.2 nm (in 7 steps). (Sample Nos. 7006A to 7013A).

TABLE 5

| Composition of the first magnetic layer | Sample No. | tRu (nm) | Brt (T-nm) | Hcr (kA/m) | Hex (kA/m) | Smf/Slf (%) | Slf/Nd (dB) |
|---|---|---|---|---|---|---|---|
| Co-(19 at %)Cr-(6 at %)Pt | 7108A | 0.0 | 8.39 | 281 | 49 | 35.5 | 22.2 |
| | 7109A | 0.2 | 8.30 | 290 | 48 | 36.3 | 22.2 |
| | 7110A | 0.4 | 3.61 | 348 | −25 | 50.4 | 24.3 |
| | 7106A | 0.5 | 3.58 | 355 | −27 | 50.0 | 24.6 |
| | 7111A | 0.6 | 3.57 | 344 | −22 | 50.8 | 24.6 |
| | 7112A | 0.8 | 3.89 | 342 | −8 | 48.1 | 24.7 |
| | 7113A | 1.2 | 6.86 | 308 | 4 | 42.7 | 22.8 |
| Co-(22 at %)Cr-(10 at %)Pt-(4 at %)B | 7008A | 0.0 | 8.71 | 295 | 26 | 39.1 | 22.1 |
| | 7009A | 0.2 | 8.59 | 305 | 24 | 39.7 | 22.2 |
| | 7010A | 0.4 | 3.96 | 347 | −28 | 49.3 | 23.4 |
| | 7006A | 0.5 | 3.89 | 344 | −30 | 49.3 | 23.1 |
| | 7011A | 0.6 | 3.97 | 336 | −27 | 49.3 | 23.4 |
| | 7012A | 0.8 | 4.27 | 326 | −8 | 49.1 | 23.4 |
| | 7013A | 1.2 | 7.09 | 307 | 2 | 43.0 | 22.5 |

Figure 14:
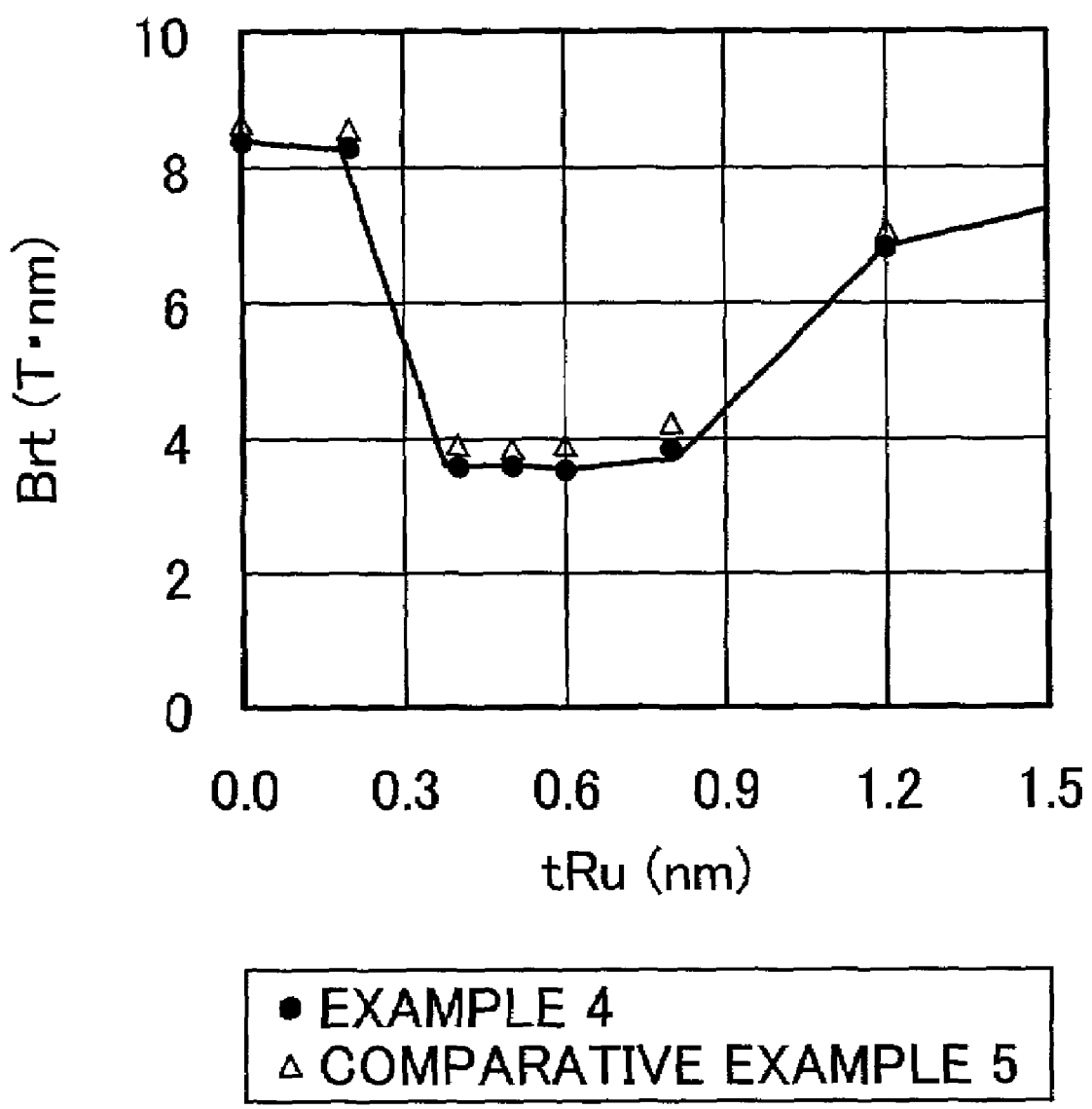
FIG. 14 is a diagram showing the relation between Brt and the thickness (tRu) of the non-magnetic intermediate layer of the magnetic recording medium in Example 4 and Comparative Example 5.
Figure 15:
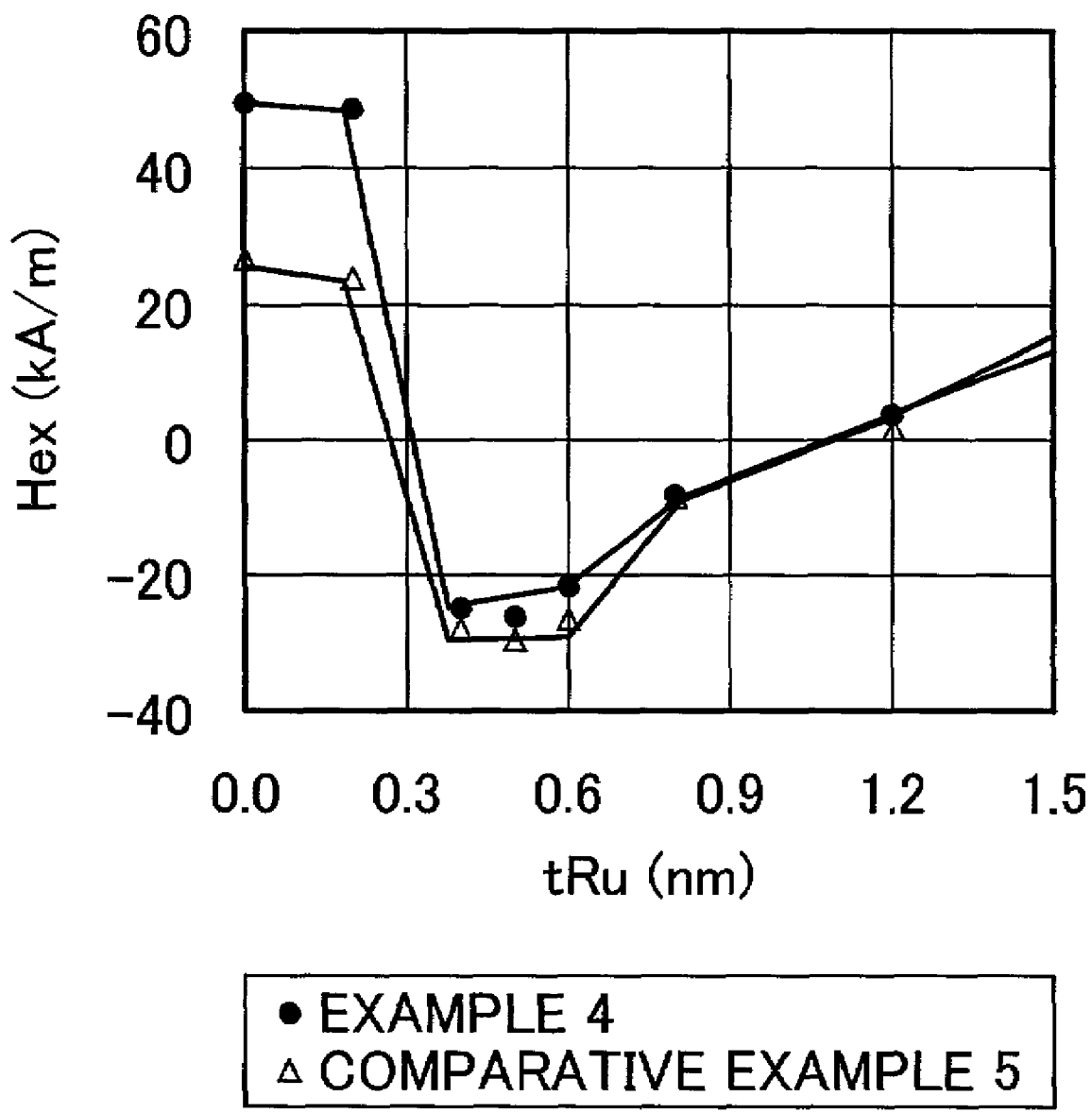
FIG. 15 is a diagram showing the relation between Hex and the thickness (tRu) of the non-magnetic intermediate layer of the magnetic recording medium in Example 4 and Comparative Example 5.

Table 5 shows the magnetic characteristics and recoding/reproducing characteristics of the magnetic recording media in Example 4 and Comparative Example 5. The values of Brt and Hex shown in Table 5 are plotted against the thickness (tRu) of the non-magnetic intermediate layer as shown respectively in FIGS. 14 and 15. It is noted that when the thickness (tRu) of the non-magnetic intermediate film is 0 nm, 0.2 nm, or 1.2 nm, the values of Brt are high and the values of Hex are positive. This indicates that the two magnetic layers holding the non-magnetic layer between them are not magnetized in the mutually antiparallel directions in the absence of an applied magnetic field. In addition, the fact that the values of Hex are positive when the thickness (tRu) of the non-magnetic intermediate layer is 0.3 nm to 0.9 nm suggests that the two magnetic layers holding the non-magnetic layer between them are magnetized in the mutually antiparallel directions in the absence of an applied magnetic field.

Figure 16:
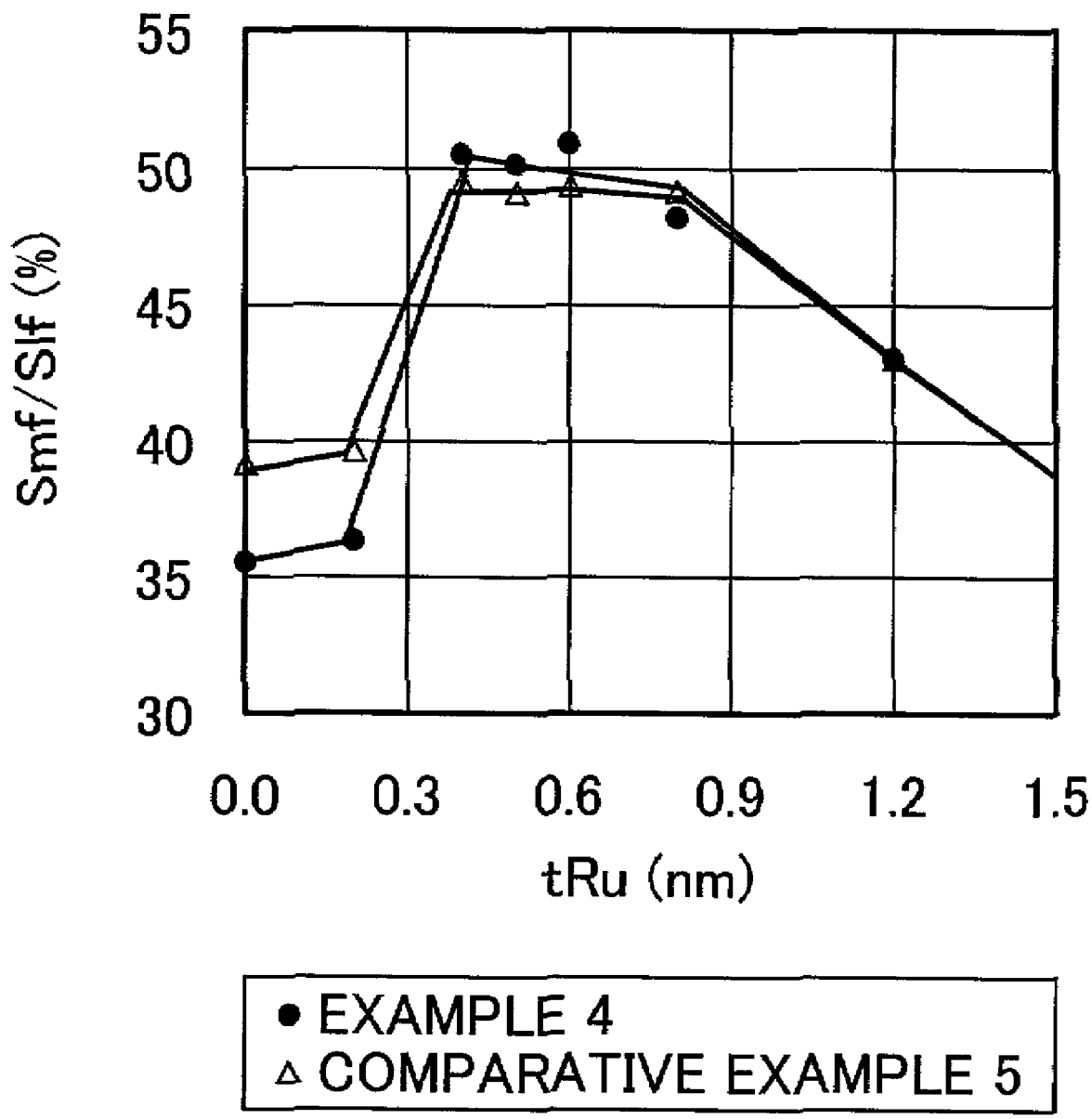
FIG. 16 is a diagram showing the relation between Smf/Slf and the thickness (tRu) of the non-magnetic intermediate layer of the magnetic recording medium in Example 4 and Comparative Example 5.
Figure 17:
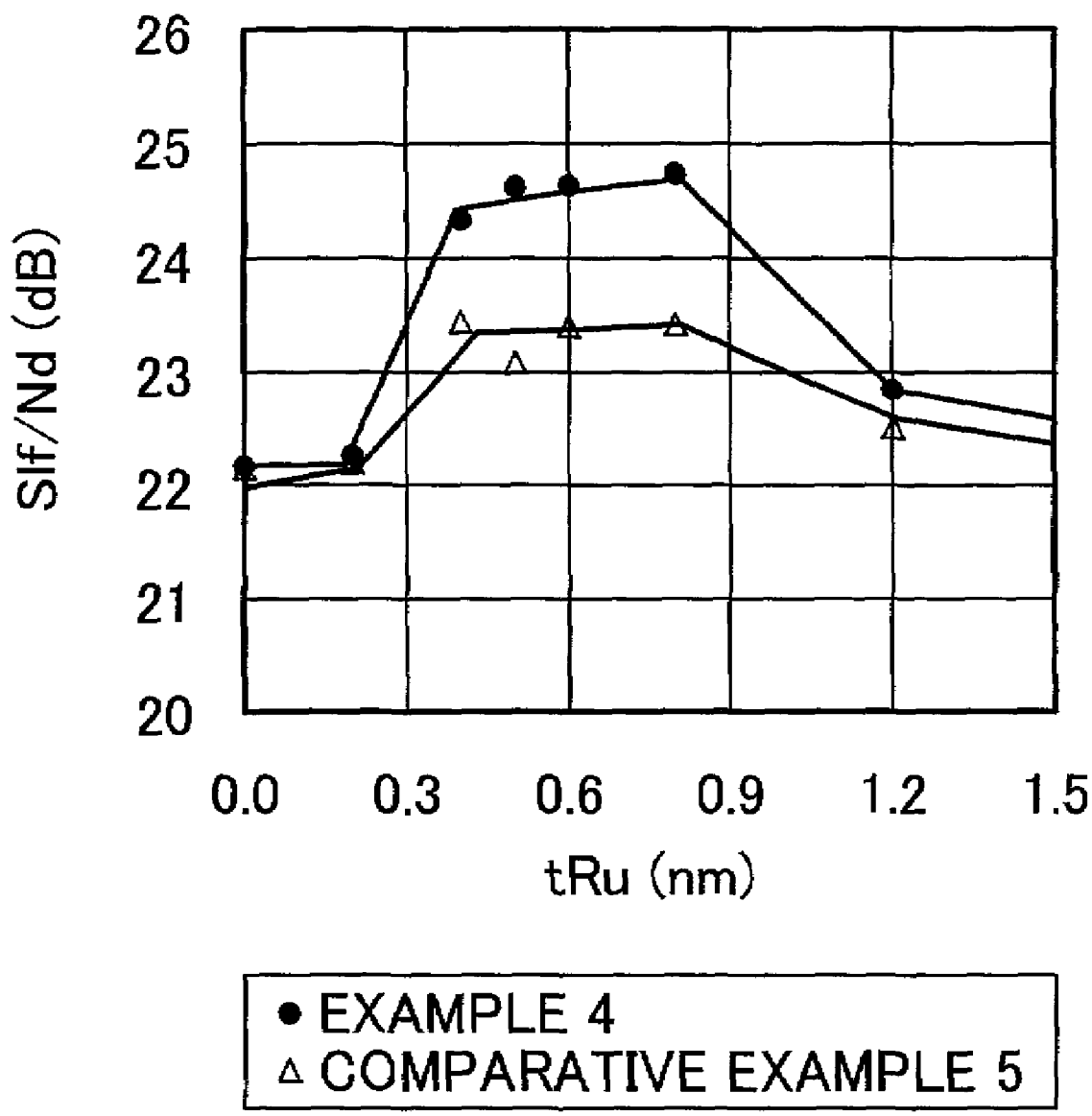
FIG. 17 is a diagram showing the relation between Slf/Nd and the thickness (tRu) of the non-magnetic intermediate layer of the magnetic recording medium in Example 4 and Comparative Example 5.

The values of Smf/Slf and Slf/Nd shown in Table 5 are plotted against the thickness (tRu) of the non-magnetic intermediate layer as shown respectively in FIGS. 16 and 17. It is noted from FIG. 16 that the resolution (Smf/Slf) has high values when the thickness (tRu) of the non-magnetic intermediate layer is in the range of 0.3 nm to 0.9 nm. With this thickness, the two magnetic layers holding the non-magnetic intermediate layer are magnetized in the mutually antiparallel directions. It is considered that the decrease in the value of Brt releases the demagnetizing field between recording bits, thereby creating steep magnetic transitions. This result is similar to that obtained from the samples in Example 4 and Comparative Examples 5. It is also noted from FIG. 17 that the values of Slf/Nd are high when the thickness (tRu) is in the range of 0.3 nm to 0.9 nm. This effect is more significant than that in the case of samples in Example 4. When the thickness (tRu) of the non-magnetic intermediate layer is out of the range of 0.3 nm to 0.9 nm, there is no difference in the value of Slf/Nd of the samples in Example 4 and Comparative Example 5. In other words, the samples with the first magnetic layer having the composition shown in Example 1 greatly improve in Slf/Nd only when the thickness (tRu) of the non-magnetic inter layer is in the range of 0.3 nm to 0.9 nm and the two magnetic layers holding the non-magnetic layer between them are magnetized in the mutually antiparallel directions.

Example 5

Samples of magnetic recording medium were prepared by the same procedure as in Example 1 except that the underlayers 12 and 12' (5 nm thick) were formed from Cr-(15 at %)Ti alloy (sample Nos. 5403A to 5409A) or the underlayers (10 nm thick) were formed from Cr-(15 at %)Ti-(3 at %)B alloy (sample Nos. 6904A to 6907A). These samples have the first and second magnetic layers whose thicknesses are tmag1 and tmag2, respectively, as shown in Table 6.

COMPARATIVE EXAMPLE 6

Samples of magnetic recording medium for comparison were prepared by the same procedure as in Example 1 except for the following.

The underlayers 12 and 12' are of laminate structure consisting a 5-nm thick layer of Cr-(20 at %)Ti alloy and a 3-nm thick layer of Co-(40 at %)Ru alloy of hexagonal close-pack structure, which are formed in the order mentioned. (Sample Nos. 3304A to 3307A) The underlayers 12 and 12' are of laminate structure consisting a 5-nm thick layer of Cr-(15 at %)Ti alloy and a 3-nm thick layer of Co-(16 at %)Mo alloy of hexagonal close-pack structure, which are formed in the order mentioned. (Sample Nos. 6704A to 6707A) The underlayers 12 and 12' are a 5-nm thick Cr film. (Sample Nos. 6804A to 6807A)

TABLE 6

| Composition of underlayer | Sample No. | tmag1 (nm) | tmag2 (nm) | Brt (T-nm) | Hcr (kA/m) | Hex (kA/m) | Smf/Slf (%) | Slf/Nd (dB) |
|---|---|---|---|---|---|---|---|---|
| Cr-(15 at %)Ti | 5403A | 5.0 | 14.5 | 3.55 | 345 | −40 | 51.9 | 24.1 |
| | 5404A | 3.0 | 14.5 | 4.53 | 325 | −65 | 49.9 | 24.1 |
| | 5406A | 4.0 | 16.0 | 4.44 | 347 | −53 | 48.9 | 23.9 |
| | 5407A | 4.0 | 14.5 | 3.78 | 339 | −54 | 50.8 | 24.2 |
| | 5408A | 4.0 | 13.0 | 3.44 | 328 | −53 | 49.5 | 24.4 |
| | 5409A | 4.0 | 11.5 | 3.21 | 313 | −53 | 50.0 | 24.7 |

TABLE 6-continued

| Composition of underlayer | Sample No. | tmag1 (nm) | tmag2 (nm) | Brt (T·nm) | Hcr (kA/m) | Hex (kA/m) | Smf/Slf (%) | Slf/Nd (dB) |
|---|---|---|---|---|---|---|---|---|
| Cr-(15 at %)Ti-(3 at %)B | 6904A | 4.0 | 13.5 | 3.51 | 309 | −66 | 52.5 | 25.2 |
| | 6905A | 4.0 | 16.5 | 4.33 | 335 | −60 | 50.6 | 25.0 |
| | 6906A | 4.0 | 18.0 | 4.99 | 335 | −62 | 48.6 | 24.8 |
| | 6906A | 4.0 | 20.0 | 5.69 | 335 | −62 | 47.2 | 24.6 |
| Co-(40 at %)Ru/Cr-(20 at %)Ti | 3304A | 4.3 | 13.6 | 2.23 | 307 | −26 | 54.4 | 23.0 |
| | 3305A | 4.3 | 16.7 | 3.04 | 335 | −26 | 51.3 | 23.3 |
| | 3306A | 4.3 | 18.4 | 3.69 | 344 | −27 | 49.4 | 23.0 |
| | 3307A | 4.3 | 20.4 | 4.42 | 343 | −26 | 48.3 | 23.0 |
| Cr-(16 at %)Mo/Cr-(15 at %)Ti | 6704A | 4.0 | 13.5 | 2.25 | 318 | −24 | 54.2 | 23.1 |
| | 6705A | 4.0 | 16.5 | 3.42 | 342 | −25 | 51.1 | 23.1 |
| | 6706A | 4.0 | 18.0 | 3.76 | 348 | −26 | 49.2 | 23.0 |
| | 6707A | 4.0 | 20.0 | 4.49 | 346 | −27 | 47.1 | 22.7 |
| Cr | 8804A | 4.0 | 13.5 | 3.15 | 319 | −17 | 53.1 | 22.7 |
| | 8805A | 4.0 | 16.5 | 4.01 | 331 | −21 | 50.1 | 22.6 |
| | 8806A | 4.0 | 18.0 | 4.51 | 336 | −17 | 48.3 | 22.6 |
| | 8807A | 4.0 | 20.0 | 5.41 | 338 | −20 | 49.0 | 22.5 |

Figure 18:
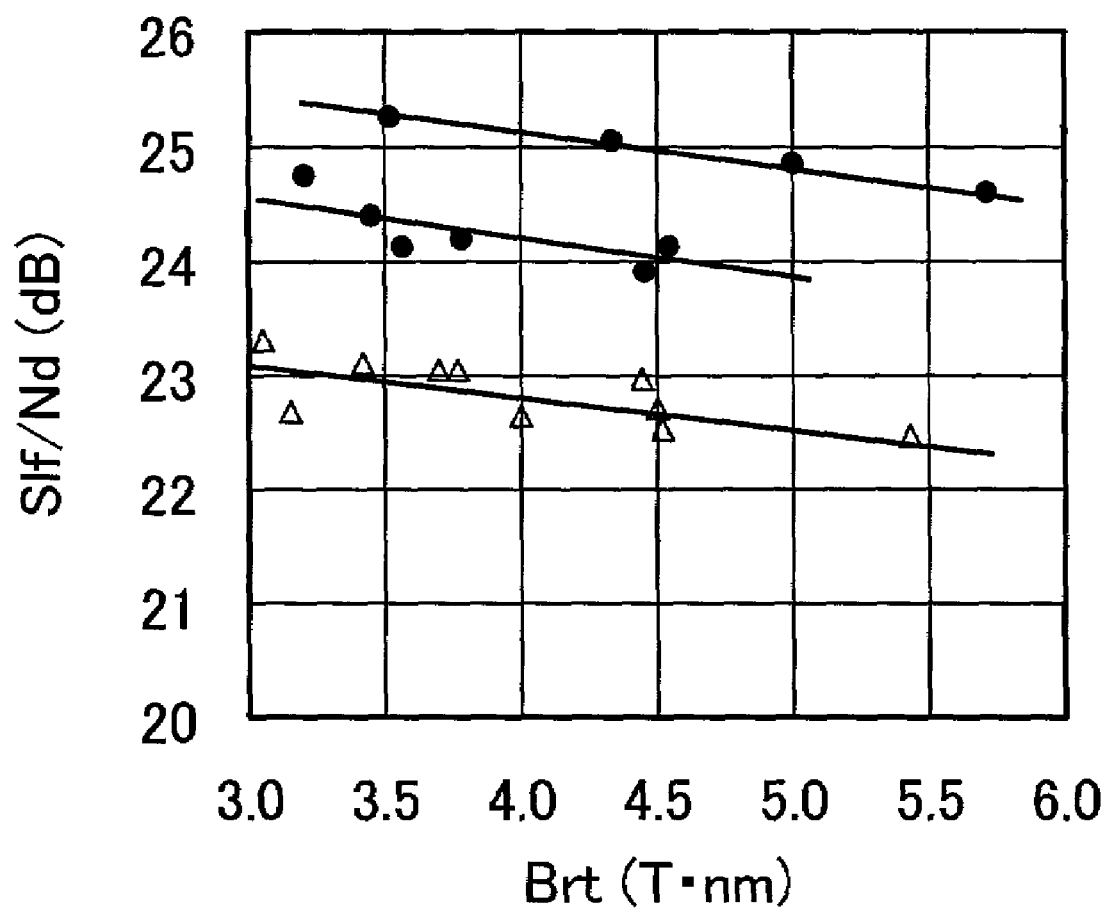
FIG. 18 is a diagram showing the relation between Brt and Slf/Nd of the magnetic recording medium in Example 5 and Comparative Example 6.

Table 6 shows the magnetic characteristics and recoding/reproducing characteristics of the magnetic recording media in Example 5 and Comparative Example 6. It is noted from Table 6 that all the samples tested have negative values of coupling magnetic field (Hex). This indicates that the two magnetic layers holding a non-magnetic intermediate layer between them are magnetized in the mutually antiparallel directions in the absence of an applied magnetic field. The values of Slf/Nd are plotted against the values of Brt as shown in FIG. 18. It is noted that the values of Slf/Nd greatly vary depending on the composition of the underlayer. In the case where the underlayer (adjacent to the first magnetic layer) is formed from Co-(40 at %)Ru alloy or Co-(16 at %)Mo alloy or the underlayer is a Cr film as in Comparative Example 6, the values of Slf/Nd are smaller than those in Example 1 (or the effect of the present invention is not produced). By contrast, in the case where the underlayer is formed from Cr-(15 at %)Ti-(3 at %)B alloy, the values of Slf/Nd are greater than those in Example 1. This result suggests that the underlayer formed from B-containing Cr—Ti alloy enhances the effect of the present invention.

Example 6

Samples of magnetic recording medium were prepared by the same procedure as in Example 1 except that the seed layers 11 and 11' (30 nm thick) were formed from Cr-(30 at %)Cr-(10 at %)Zr alloy. They were tested for resolution (Smf/Slf) and media S/N ratio (Slf/Nd). A group of samples in Example 1 and a group of samples in this example, both having a Brt value of about 3.8 T·nm, were compared with each other. It was found that the former has a smaller Smf/Slf value by about 2% and a smaller Slf/Nd value by about 0.3 dB. The samples in this example were examined by X-ray diffractometry to see the crystal orientation of the magnetic layer. It was found that they have the (11.0) orientation of hexagonal close-pack structure but they have a lower degree of orientation (as indicated by a weaker intensity of X-ray diffraction peaks) than those samples in Example 1.

It turned out that the seed layer formed from Ni—Ta alloy as in Example 1 produces a better effect than the seed layer formed from other metal. In order to produce the effect of the present invention, it is desirable to form the seed layer (between the substrate and the underlayer) from Ni—Ta alloy so that the magnetic layer orients in the (11.0) direction with hexagonal close-pack structure.

For the purpose of comparison, samples of magnetic recording medium were prepared by the same procedure as in Example 1 except that the seed layers 11 and 11' were formed from Ni-(35 at %)Ta alloy or Ni-(40 at %)Ta alloy and that change was made in the pressure of Ar(99%)-O$_2$ (1%) mixture gas introduced during heating. In the case where the pressure of the mixed gas is 1.4 Pa or 1.1 Pa for the seed layer of Ni-(35 at %)Ta alloy or Ni-(40 at %)Ta alloy, respectively, the value of Slf/Nd is maximum. Samples of magnetic recording medium were prepared in which the first magnetic layer was formed from different alloys under the condition that the pressure of the mixed gas gives the maximum value of Slf/Nd. The resulting samples produced the same effect as in Example 1.

Example 7

Figure 19:
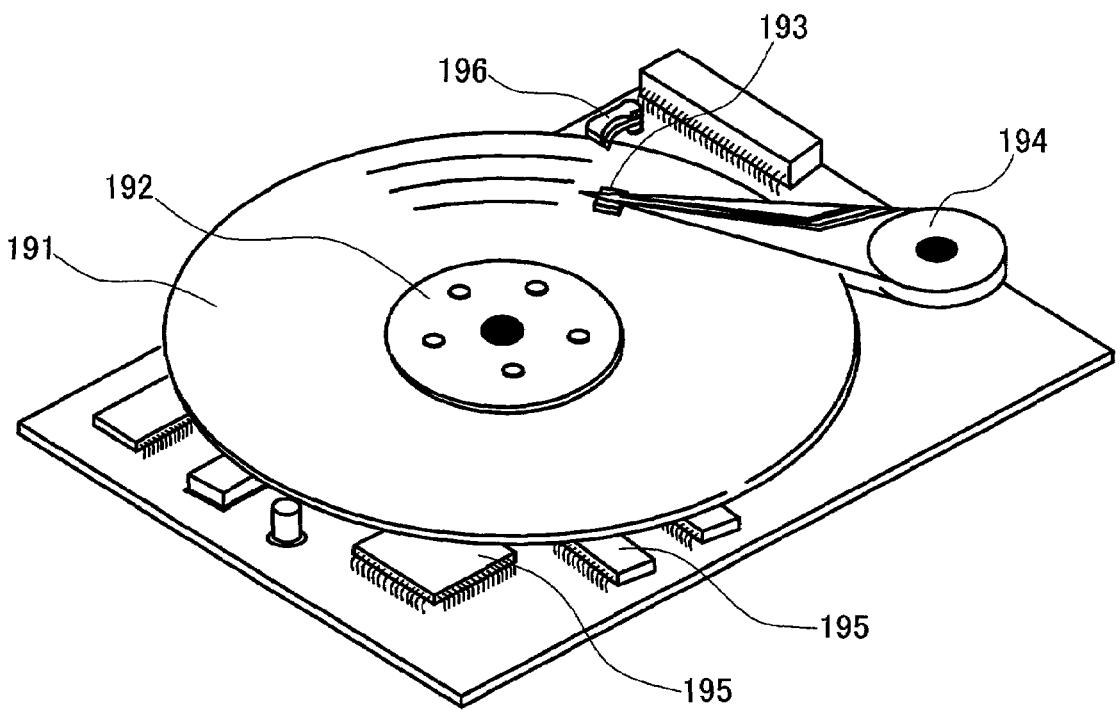
FIG. 19 is a schematic diagram showing one example of the magnetic storage according to the present invention.

A practical magnetic disk device as shown in FIG. 19 was assembled from a magnetic recording medium 191 (which was obtained in any of Examples 1 to 6 above), a drive unit 192 to turn the magnetic recording medium, a magnetic head 193 consisting of a writing part and a reading part, a means 194 to move the magnetic head relative to the magnetic recording medium, and a signal processing unit to send and receive signals to and from the magnetic head.

Figure 20:
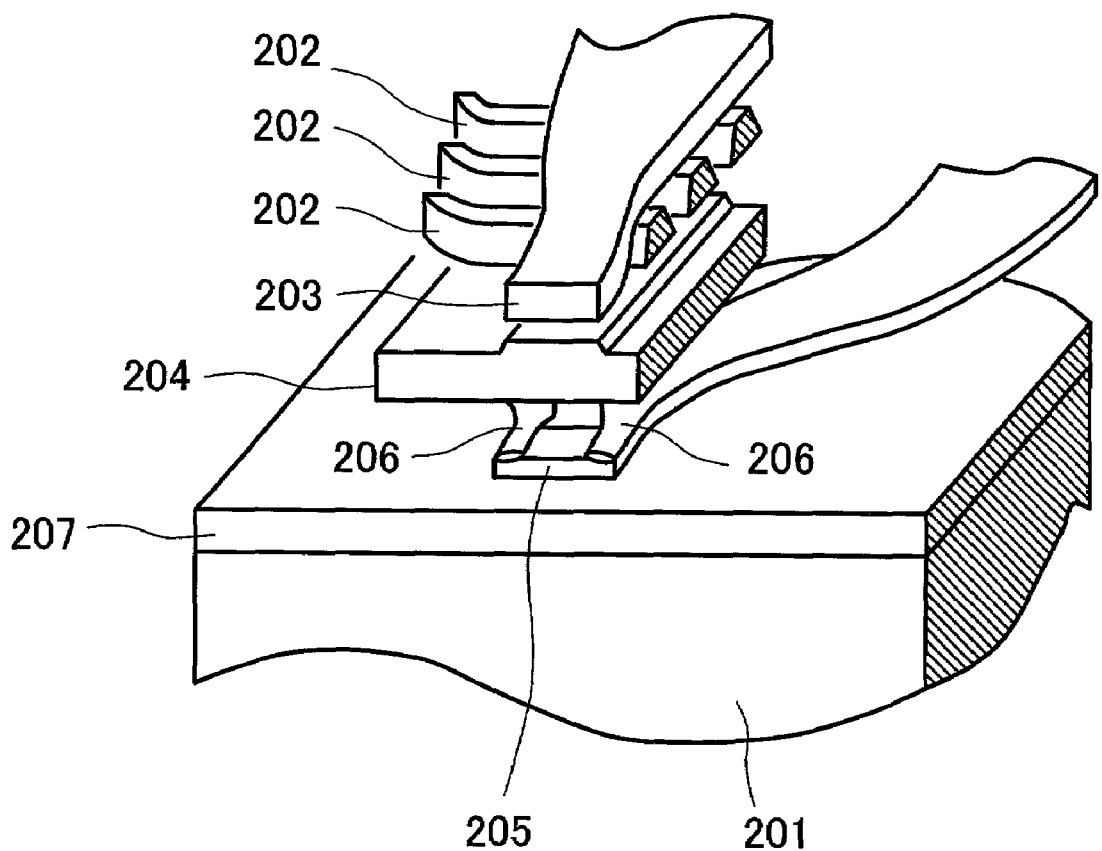
FIG. 20 is a schematic diagram showing one example of the structure of the magnetic head used in the present invention.

The magnetic head is constructed as shown in FIG. 20. It is a composite one consisting of an inductive head for writing and a magneto-resistive effect head for reading, both formed on a substrate 201. The writing head consists of an upper writing magnetic pole 203 and a lower writing magnetic pole 204 (which also functions as an upper shield layer), with a coil 202 interposed between them. The gap layer between the writing magnetic poles is 0.14 µm thick. The reading head consists of a magneto-resistive sensor 205 and electrode patterns 206 arranged at both ends thereof. The magneto-resistive sensor is held between the lower recording magnetic pole 204 (which also functions as an upper shield layer) and a lower shield layer 207. The two shield layers are 0.09 µm apart.

Figure 21:
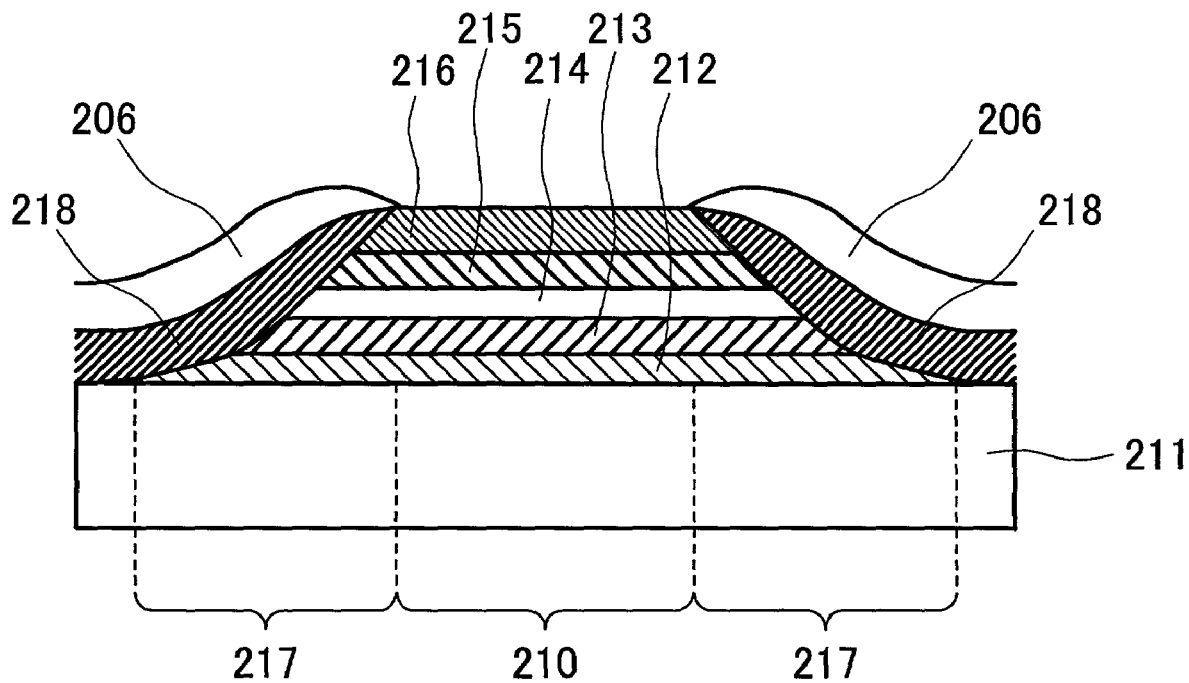
FIG. 21 is a sectional view showing the structure of one example of the magneto-resistive sensor used in the present invention.

The magneto-resistive sensor has a sectional structure as shown in FIG. 21. The writing/reading characteristics were evaluated under the following conditions.

Linear recording density: 640 kBPI (bit per inch)
Track density: 55 kTPI (track per inch)
Magnetic spacing between the magnetic head and the surface of the magnetic film: 23 nm It was found that all the samples tested meet requirements for the magnetic disk device with an areal density of 35 Gbit/in$^2$. It was also found that the bit error rate after standing at 70° C. for 100 hours is less than half an order. The substrate used for the magnetic recording medium is not limited to glass substrate. It may be replaced, without any loss, by an Al alloy substrate with Ni—P plating, a crystalline glass substrate, or a silicon substrate. The effect of the present invention is also produced even when the magneto-resistive sensor for the reading head is replaced by a magneto-resistive effect tunnel junction.

[Effect of the invention] The magnetic recording medium according to the present invention has a lower media noise level while keeping a good thermal stability for recording bits as compared with the conventional magnetic recording medium. It realizes a magnetic storage capable of high-density recording with high reliability.

What is claimed is:

1. A magnetic recording medium comprising:
   a substrate;
   an underlayer formed over said substrate and
   a magnetic recording layer formed directly on said underlayer, having a first magnetic layer, a non-magnetic intermediate layer directly formed on the first magnetic layer, and a second magnetic layer directly formed on the non-magnetic intermediate layer, wherein
   said first magnetic layer includes Co, Pt, and Cr,
   said non-magnetic intermediate layer is made of Ru and has a thickness of 0.4 to 0.8 nm,
   said second magnetic layer contains Co as a main component,
   said first magnetic layer and said second magnetic layer are magnetized in the antiparallel direction in the absence of an applied magnetic field and said first magnetic layer is formed to contain an amount of Pt no less than 3 at % and no more than 9 at % so as to improve a signal-to-noise ratio of the magnetic recording medium, and
   said underlayer comprises Cr and Ti.

2. A magnetic recording medium including a substrate and a magnetic recording layer formed thereon with an underlayer interposed between them, wherein said magnetic recording layer comprises:
   a first magnetic layer containing only Co, Cr and Pt formed directly on said underlayer,
   a non-magnetic intermediate layer directly formed on said first magnetic layer,
   a second magnetic layer directly formed on said non-magnetic intermediate layer, and
   said non-magnetic intermediate layer is made of Ru and has a thickness of 0.4 to 0.8 nm, wherein
   said first magnetic layer and said second magnetic layer are magnetized in the antiparallel direction in the absence of an applied magnetic field, said first magnetic layer being formed to contain an amount of Pt that is no less than 3 at % and no more than 9 at % so as to improve a signal-to-noise ratio of the magnetic recording medium,
   said magnetic recording layer is formed directly on said underlayer, wherein said underlayer includes Cr and Ti.

3. A magnetic recording medium according to claim 1 further comprising; a metal film having an amorphous structure or microcrystalline structure, which is formed between said substrate and said underlayer containing Cr and Ti.

4. A magnetic recording medium according to claim 3, wherein the metal film is composed of an alloy containing Ta and Ni.

5. A magnetic storage which comprises a magnetic recording medium, a drive unit to turn the magnetic recording medium, a magnetic head consisting of a writing part and a reading part, a means to move the magnetic head relative to the magnetic recording medium, and a signal processing unit to send and receive signals to and from the magnetic head, wherein the reading part of said magnetic head is a giant magneto-resistive effect element or has a tunnel junction which produces the magneto-resistive effect, and said magnetic recording medium which is comprised of:
   a substrate;
   an underlayer formed over said substrate, said underlayer including; and
   a magnetic recording layer formed directly on said underlayer, having a first magnetic layer, a second magnetic layer and, a non-magnetic intermediate layer formed between said first magnetic layer and said second magnetic layer, wherein
   said first magnetic layer comprising only Co, Pt, and Cr is formed directly on said underlayer that includes Cr and Ti,
   said non-magnetic intermediate layer formed directly on said first magnetic layer is made of Ru,
   said non-magnetic intermediate layer has a thickness of 0.4 to 0.8 nm,
   said second magnetic layer formed directly on said non-magnetic intermediate layer contains Co as a main component,
   said first magnetic layer and said second magnetic layer are magnetized in the antiparallel direction in the absence of an applied magnetic field, and said first magnetic layer is formed to contain an amount of Pt that is no less than 3 at % and no more than 9 at % so as to improve a signal-to-noise ratio of the magnetic recording medium.

6. A magnetic storage which comprises a magnetic recording medium, a drive unit to turn the magnetic recording medium, a magnetic head consisting of a writing part and a reading part, a means to move the magnetic head relative to the magnetic recording medium, and a signal processing unit to send and receive signals to and from the magnetic head, wherein the reading part of said magnetic head is a giant magneto-resistive effect element or has a tunnel junction which produces the magneto-resistive effect, and said magnetic recording medium is one which is comprised of:
   a substrate and a magnetic recording layer formed thereon with an underlayer interposed between them, wherein said magnetic recording layer comprises:
   a first magnetic layer containing only Co, Cr and Pt formed directly on said underlayer,
   a second magnetic layer, and
   a non-magnetic intermediate layer formed between said first magnetic layer and said second magnetic layer,
   said first magnetic layer and said second magnetic layer are magnetized in the antiparallel direction in the absence of an applied magnetic field, said first magnetic layer being formed to contain an amount of Pt that is no less than 3 at % and no more than 9 at % so as to improve a signal-to-noise ratio of the magnetic recording medium, wherein said magnetic recording layer is formed directly on said underlayer, wherein said underlayer includes Cr and Ti, said non-magnetic intermediate layer is formed directly on said first magnetic layer, said second magnetic layer is formed directly on said non-magnetic intermediate layer, said non-magnetic intermediate layer formed directly on said first magnetic layer is made of Ru, and said non-magnetic intermediate layer has a thickness of 0.4 to 0.8 nm.

7. A magnetic recording medium according to claim 1, further comprising a protective layer formed over said magnetic recording layer and directly on said second magnetic layer.

* * * * *